(12) United States Patent
Dutta

(10) Patent No.: US 12,375,405 B2
(45) Date of Patent: Jul. 29, 2025

(54) PATH CONGESTION NOTIFICATION

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 721 days.

(21) Appl. No.: 17/196,537

(22) Filed: Mar. 9, 2021

(65) Prior Publication Data

US 2022/0294737 A1 Sep. 15, 2022

(51) Int. Cl.
*H04L 47/125* (2022.01)
*H04L 45/12* (2022.01)
*H04L 47/24* (2022.01)

(52) U.S. Cl.
CPC ............ *H04L 47/125* (2013.01); *H04L 45/12* (2013.01); *H04L 47/24* (2013.01)

(58) Field of Classification Search
CPC ........ H04L 47/125; H04L 45/12; H04L 47/24
See application file for complete search history.

(56) References Cited

U.S. PATENT DOCUMENTS

| | | | | |
|---|---|---|---|---|
| 5,400,329 A | * | 3/1995 | Tokura ................ | H04L 12/5602 370/396 |
| 7,151,773 B1 | * | 12/2006 | Mo .................... | H04Q 11/0478 370/465 |
| 7,369,498 B1 | * | 5/2008 | Ma .......................... | H04L 47/30 370/235 |
| 9,692,687 B2 | * | 6/2017 | Kompella ............... | H04L 45/28 |

(Continued)

FOREIGN PATENT DOCUMENTS

| | | | | |
|---|---|---|---|---|
| EP | 2413542 A1 | * | 2/2012 | ............ H04L 47/10 |
| EP | 3726788 A1 | * | 10/2020 | ............... B60P 1/42 |

(Continued)

OTHER PUBLICATIONS

N. Rouhana and E. Horlait, "TCP rate implicit control (TRIC)," Proceedings. Sixth IEEE Symposium on Computers and Communication, IEEE, 2001, pp. 720-725, (Year: 2001).*

(Continued)

*Primary Examiner* — David R Lazaro
*Assistant Examiner* — Robert A Shaw
(74) *Attorney, Agent, or Firm* — Tong, Rea, Bentley & Kim, LLC

(57) ABSTRACT

An ingress node includes a transceiver that transmits a packet along a first path from the ingress node to an egress node. The packet includes a globally unique node identifier (node ID) for the ingress node and a path identifier (path ID) of the first path. The transceiver also receives a path congestion notification (path-CN) message in response to congestion along the first path. The path-CN message is addressed to the ingress node based on the node ID and includes the path ID. The ingress node also includes a processor that selects a second path in response to receiving the path-CN message. The transceiver transmits subsequent packets in the flow along the second path. Transit nodes include a transceiver that receives packets including the node ID and the path ID. A processor in the transit node generates the path-CN message based on the node ID.

18 Claims, 17 Drawing Sheets

(56) References Cited

U.S. PATENT DOCUMENTS

| | | | | |
|---|---|---|---|---|
| 10,574,577 | B1* | 2/2020 | Matthews | H04L 47/21 |
| 11,075,847 | B1* | 7/2021 | Kwan | H04L 47/33 |
| 2002/0136163 | A1* | 9/2002 | Kawakami | H04L 47/26 |
| | | | | 370/229 |
| 2004/0047353 | A1* | 3/2004 | Umayabashi | H04L 12/4666 |
| | | | | 370/395.63 |
| 2005/0188109 | A1* | 8/2005 | Shiga | H04L 47/10 |
| | | | | 709/239 |
| 2006/0198308 | A1* | 9/2006 | Vasseur | H04L 67/51 |
| | | | | 370/465 |
| 2007/0041326 | A1* | 2/2007 | Babiarz | H04L 47/125 |
| | | | | 370/248 |
| 2009/0268614 | A1* | 10/2009 | Tay | H04L 47/33 |
| | | | | 370/236 |
| 2010/0027424 | A1* | 2/2010 | Radunovic | H04W 40/04 |
| | | | | 370/238 |
| 2011/0016209 | A1* | 1/2011 | Moncaster | H04L 47/10 |
| | | | | 709/224 |
| 2011/0063979 | A1* | 3/2011 | Matthews | H04L 45/302 |
| | | | | 370/237 |
| 2011/0141891 | A1* | 6/2011 | So | H04L 47/33 |
| | | | | 370/235 |
| 2011/0164501 | A1* | 7/2011 | Dunbar | H04L 43/10 |
| | | | | 370/236.2 |
| 2011/0182194 | A1* | 7/2011 | Jacquet | H04L 47/12 |
| | | | | 370/252 |
| 2012/0069739 | A1* | 3/2012 | Yabusaki | H04L 47/32 |
| | | | | 370/235 |
| 2012/0287791 | A1* | 11/2012 | Xi | H04L 47/125 |
| | | | | 370/237 |
| 2013/0107872 | A1* | 5/2013 | Lovett | H04L 49/00 |
| | | | | 370/352 |
| 2014/0071831 | A1* | 3/2014 | Sinha | H04L 43/0882 |
| | | | | 370/241.1 |
| 2014/0169173 | A1* | 6/2014 | Naouri | H04L 49/351 |
| | | | | 370/237 |
| 2014/0269305 | A1* | 9/2014 | Nguyen | H04L 47/125 |
| | | | | 370/235 |
| 2015/0146526 | A1* | 5/2015 | Kulkarni | H04L 47/122 |
| | | | | 370/230.1 |
| 2015/0372918 | A1* | 12/2015 | Zhou | H04L 47/11 |
| | | | | 370/230 |
| 2016/0226773 | A1* | 8/2016 | Sundaram | H04L 45/12 |
| 2017/0041239 | A1* | 2/2017 | Goldenberg | H04L 47/11 |
| 2019/0268268 | A1* | 8/2019 | Eastlake, III | H04L 47/115 |
| 2019/0319882 | A1* | 10/2019 | Yuan | H04L 47/28 |
| 2020/0044963 | A1* | 2/2020 | Kwok | H04L 45/125 |
| 2020/0044973 | A1* | 2/2020 | Hei | H04L 45/28 |
| 2020/0084155 | A1* | 3/2020 | Song | H04L 49/9068 |
| 2020/0280518 | A1* | 9/2020 | Lee | H04L 47/30 |
| 2020/0334195 | A1* | 10/2020 | Chen | H04L 69/14 |
| 2020/0366610 | A1* | 11/2020 | Wang | H04L 47/12 |
| 2021/0029041 | A1* | 1/2021 | Yuan | H04L 45/22 |
| 2021/0119930 | A1* | 4/2021 | Debbage | H04L 1/1642 |
| 2021/0127296 | A1* | 4/2021 | Akl | H04W 40/02 |
| 2021/0243107 | A1* | 8/2021 | Retana | H04L 45/34 |
| 2021/0320820 | A1* | 10/2021 | Ruan | H04L 49/602 |
| 2021/0328860 | A1* | 10/2021 | Zhou | H04L 47/33 |
| 2021/0328930 | A1* | 10/2021 | Nikolaidis | H04L 47/127 |
| 2022/0286938 | A1* | 9/2022 | Wang | H04W 40/22 |

FOREIGN PATENT DOCUMENTS

| | | | | |
|---|---|---|---|---|
| JP | 2005057514 | A | * 3/2005 | |
| WO | WO-0187000 | A1 | * 11/2001 | H04L 41/12 |
| WO | WO-2018107908 | A1 | * 6/2018 | H04L 45/125 |
| WO | WO-2021006691 | A1 | * 1/2021 | H04L 45/14 |

OTHER PUBLICATIONS

Anand Kulkarni, Congestion Control in Wireless Sensor Network, Masters Thesis, Auburn University, Auburn, Alabama Aug. 9, 2010 (Year: 2010).*

He et al., Congestion Control Technology in Wireless Sensor Networks,2018 IEEE 4th Information Technology and Mechatronics Engineering Conference (ITOEC 2018), IEEE 2018 (Year: 2018).*

Andersson, L., et al., "LDP Specification", Request for Comments 5036, https://tools.ietf.org/html/rfc5036, Oct. 2007, 135 pages.

Moy, J., "OSPF Version 2", Request for Comments 2328, https://tools.ietf.org/html/rfc2328, Apr. 1998, 244 pages.

Coltun, R., et al., "OSPF for IPV6", Request for Comments 5340, https://tools.ietf.org/html/rfc5340, Jul. 2008, 94 pages.

Callon, Ross W., "Use of OSI IS-IS for Routing in TCP/IP and Dual Environments", Request for Comments 1195, https://tools.ietf.org/html/rfc1195, Dec. 1990, 68 pages.

Filsfils, C., et al., "Segment Routing Architecture", Request for Comments 8402, https://tools.ietf.org/html/rfc8402, Jul. 2018, 32 pages.

Bashandy, A., et al., "Segment Routing with the MPLS Data Plane", Request for Comments 8660, https://tools.ietf.org/html/rfc8660, Dec. 2019, 29 pages.

Awduche, D., et al., "RSVP-TE: Extensions to RSVP for LSP Tunnels", Request for Comments 3209, https://tools.ietf.org/html/rfc3209, Dec. 2001, 61 pages.

Jamoussi, B., et al., "Constraint-Based LSP Setup using LDP", Request for Comments 3212, https://tools.ietf.org/html/rfc3212, Jan. 2002, 42 pages.

University of Southern California, Information Sciences Institute, "Internet Protocol", Request for Comments 791, https://tools.ietf.org/html/rfc791, Sep. 1981, 49 pages.

Deering, S., et al., "Internet Protocol, Version 6 (IPv6) Specification", Request for Comments 2460, https://tools.ietf.org/html/rfc2460, Dec. 1998, 39 pages.

"Shortest Path Bridging", IEEE 802.1aq, http://www.ieee802.org/1/pages/802.1aq.html.

Fedyk, D., et al., "IS-IS Extensions Supporting IEEE 802.1aq Shortest Path Bridging", Request for Comments 6329, https://tools.ietf.org/html/rfc6329, Apr. 2012, 37 pages.

Postel, J., "Internet Control Message Protocol", Request for Comments 792, https://tools.ietf.org/html/rfc792, Sep. 1981, 21 pages.

Conta, A., et al., "Internet Control Message Protocol (ICMPv6) for the Internet Protocol Version 6 (IPv6) Specification", Request for Comments 4443, https://tools.ietf.org/html/rfc4443, Mar. 2006, 24 pages.

U.S. Appl. No. 17/135,448, filed Dec. 28, 2020.

* cited by examiner

PATH CONGESTION NOTIFICATION

BACKGROUND

Networks are composed of nodes (such as routers or bridges) that forward packets over corresponding links between the nodes. In many circumstances, there are multiple paths available to convey packets through the network from a source to a destination. For example, if packet forwarding is performed according to a shortest path first (SPF) algorithm, link-state protocols flood the status of locally connected networks and links of the nodes across the network. Each node builds an identical copy of the network topology based on the status information and then independently computes the paths to every other node (and any advertised networks) using path algorithms such as Dijkstra's SPF algorithm, which computes the shortest paths between the nodes in a graph that represents the network. In some cases, the path algorithm implemented at a node identifies multiple paths that incur the same costs to convey packets between a source and a destination. These paths are referred to as equal cost multiple paths (ECMP) and the ECMP can be used for load-balancing. Explicit path routing algorithms classify packets into packet flows, e.g., by hashing predetermined fields or characteristics of the packets. The explicit path for the flow can be computed based on quality-of-service (QoS) requirements of the flow using traffic engineering algorithms. Packets belonging to the flow are transmitted along the explicit path. The explicit paths can be stateful or stateless and, unlike shortest path routing, any number of explicit paths can be calculated between a source and a destination, and each path can satisfy a different QoS requirement. Randomized load-balancing (RLB) can be used to load balance packets fairly across available paths between a source or destination, e.g., by distributing the packets evenly over a set of unequal cost maximally disjoint paths to the destination. The maximally disjoint paths are paths to the destination along a set of maximally disjoint trees computed by a node. An ingress node that performs RLB sends the packets along a maximally disjoint path by encoding the explicit path (e.g., a source routed path) into the packet.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
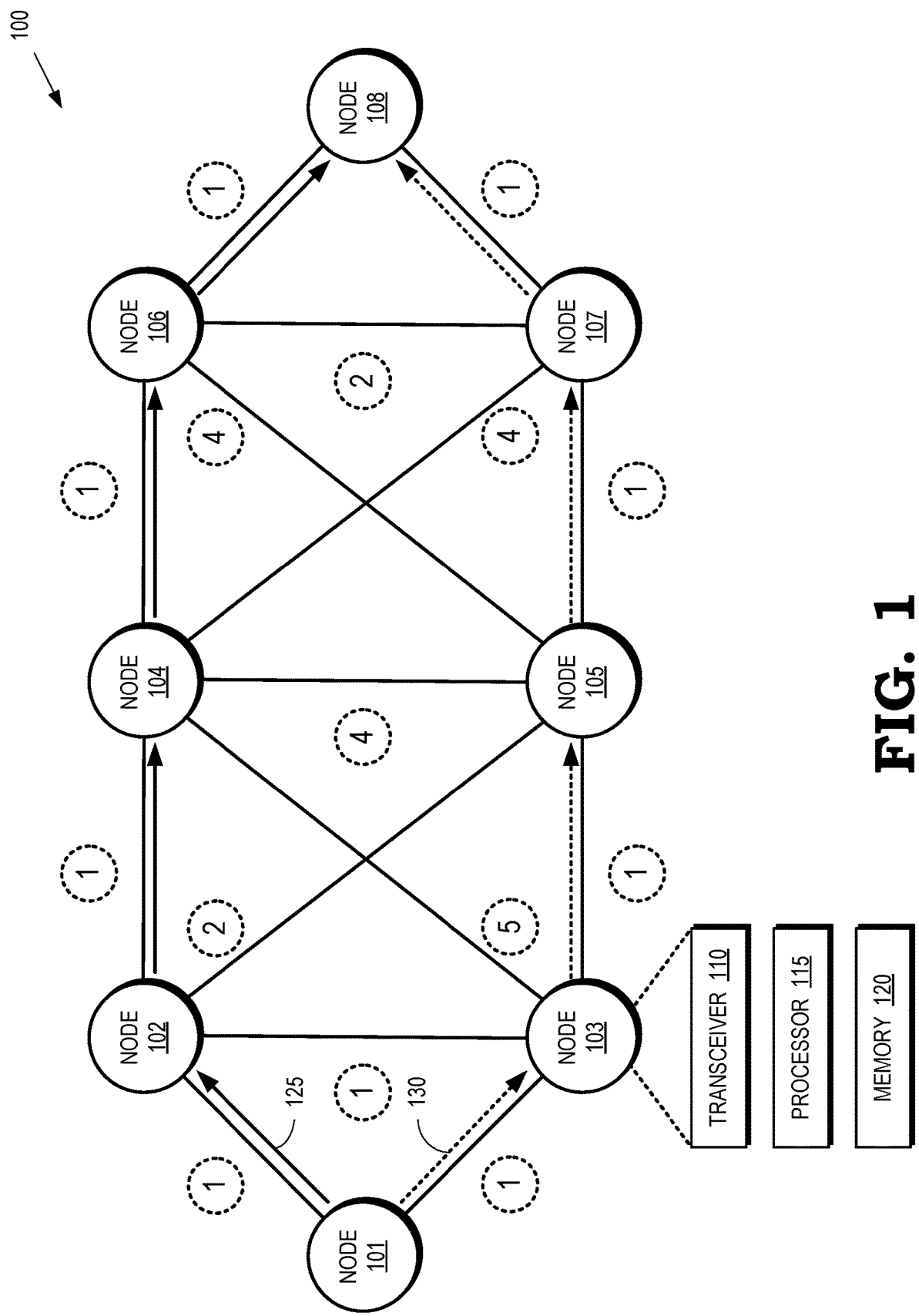
FIG. 1 is a block diagram of a communication system that supports equal cost multipath (ECMP) using packet switching according to some embodiments.

Congestion occurs in a network when the resources at a node (or on a link between nodes) are oversubscribed. In networks that implement shortest path routing or RLB, typically there is no policing or accounting of traffic at the ingress nodes to the network, which may result in congestion along a node along a forwarding path. In networks that implement traffic engineered explicit path routing, ingress nodes typically perform policing or accounting of traffic on a per-flow basis to ensure that the traffic for each flow does not exceed its negotiated bandwidth. However, if there is an error in the traffic policing at an ingress node the error may cause congestion along a node in a forwarding path. Packets in one or more flows that traverse the node or link are therefore dropped because the resources needed to transmit the packets are unavailable.

Nodes are not aware of downstream congestion experienced by packets transmitted along corresponding paths and conventional nodes are not configured to notify upstream nodes of the presence of congestion. Furthermore, in some cases, transit nodes are not aware of the ingress node or the path associated with received packets. The transit nodes are therefore unable to notify the ingress node of congestion along a path chosen by the ingress node. The ingress node is therefore unable to take appropriate action to minimize the congestion. For example, nodes forward source-routed packets based on a topmost entry in an explicit path that is included in the packet and popped from the packet prior to forwarding. Transit nodes are therefore unaware of the ingress node or the upstream portion of the explicit path traversed by the source-routed packets. For another example, packets that are load balanced across multiple paths using RLB include an explicit path that is encoded into the packet. As in the case of source-routed packets, the RLB packets are forwarded based on a topmost entry in the encoded explicit path so that transit nodes are unaware of the ingress node or the upstream portion of the explicit path traversed by the RLB packets. For another example, in shortest path routing, packets that are load balanced across multiple ECMP paths by a load balancing node are forwarded along each path using destination-based routing. Nodes along an ECMP path are therefore agnostic of the load balancing node or an identification of the path at the load balancing node. In shortest path routing, any node along an ECMP path can become a load balancing node by further load balancing on a set of ECMP paths originating from the node. Consequently, despite the availability of multiple paths through the network, ingress nodes are unable to route packets away from paths that are experiencing congestion because they are unaware that the congestion is occurring along the path.

FIGS. 1-18 disclose systems and techniques for mitigating congestion in multipath networks by detecting congestion for a first path in a transit node and sending a path congestion notification (path-CN) to an ingress node for packets in a flow that are transmitted along the first path to an egress node for a destination. In response to receiving the notification, the ingress node transmits packets in the flow along a second path to the egress node. In some embodiments, the ingress node is identified by a globally unique node identifier (ingress node ID) and the ingress node allocates locally unique path identifiers such as a first path ID for the first path and a second path ID for the second path. Packets transmitted by the ingress node are encoded with a tuple that includes the ingress node ID and the locally unique path identifier, e.g., the first path ID for packets transmitted along the first path. In shortest path routing networks, only the first load balancing node (which is referred to herein as the ingress node) encodes the tuple into a packet. The tuple encoded by the ingress node is maintained throughout the flight of the packet. A subsequent load balancing node along a path would find that the tuple already exists and so does not encode its own tuple into the packet.

Transit nodes send path-CN messages to the ingress node in response to congestion at the transit node. For example, if a transit node along the first path detects congestion, the transit node parses received packets to identify a tuple including the ingress node ID and the first path ID. If the tuple is present, the transit node sends a path-CN to the ingress node using the ingress node ID included in the received packets. Some embodiments of the path-CN message include information such as a tuple of the path identifier and a retry interval that indicates when the ingress node should make another attempt to transmit packets along the first path. A predetermined number of path-CN messages are transmitted to the ingress node in case the path-CN messages are dropped or lost in transit back to the ingress node. The transit node creates a temporary state for the tuple for a monitoring interval, which is less than the retry interval indicated in the path-CN message. The transit node does not transmit additional path-CN messages in response to receiving subsequent packets from the ingress node via the first path while the temporary state exists for the tuple. The temporary state is deleted at the end of the monitoring interval. In response to receiving the path-CN message, the ingress node transmits subsequent packets along the second path for the retry interval (if present in the path-CN message). Some embodiments of the ingress node determine a retry interval if one is not indicated in the path-CN message. Some embodiments of the ingress node limit the rate of packets transmitted along the first path as mitigation effort. The ingress router reverts to the first path upon expiration of the retry interval or in response to receiving an indication of congestion, unusability, or failure of the second path.

FIG. 1 is a block diagram of a communication system 100 that supports equal cost multipath (ECMP) using packet switching according to some embodiments. The communication system 100 includes nodes 101, 102, 103, 104, 105, 106, 107, 108, which are collectively referred to herein as "the nodes 101-108." In the illustrated embodiment, the communication system 100 is implemented as a packet-switched network and the nodes 101-108 are implemented as routers that operate according to the Internet protocol (IP). However, the nodes 101-108 can also be implemented as bridges that operate according to the Ethernet protocol. Each of the nodes 101-108 includes a transceiver 110 (or a combination of one or more receivers or transmitters) for transmitting and receiving packets that represent messages exchanged between the nodes 101-108. Each of the nodes 101-108 also includes a processor 115 for executing instructions to perform operations on data and generating results based on performing the operations on the data. Each of the nodes 101-108 further includes a memory 120 that stores information representing the instructions, the data, and the results generated by the processor 115.

Links between the nodes 101-108 are identified by the endpoints of the link. For example, a link between the node 101 and the node 102 is represented as 101→102. Links that convey traffic in different directions between the nodes can be implemented using the same physical connection or different physical connections. For example, the link 101→102 can use the same physical connection as the link 102→101 in some cases and in other cases the link 101→102 uses a different physical connection than the link 102→101. Links that use the same physical connection in different directions can be represented as 101↔102. The links between the nodes 101-108 are assigned costs (which are also referred to as distances or metrics). For example, the cost associated with link 101→102 is one, as indicated by the number in the dashed circle associated with link 101→102. In the illustrated embodiment, the costs of the links are symmetric regarding the direction of the link, although different costs can be associated with links in different directions.

Paths between the nodes 101-108 are determined using shortest path algorithms such as Djikstra's shortest path first (SPF) algorithm. The shortest path is the path that has the lowest total cost for the links between the endpoints of the paths. The nodes 101-108 flood the communication system 100 with identifying information. For example, in IP networks, IGPs (Interior Gateway Protocols) running in the nodes 101-108 flood the status of their adjacent links and local networks across the communication system 100. Using this flooding mechanism, the nodes 101-108 build an identical topology database of the communication system 100 based on the flooded information and the costs of each link. Then IGPs at the nodes 101-108 compute the IP routes to every other node (destination) using SPF and build their corresponding IP routing tables. Well known IGPs are OSPF, IS-IS, OSPFv3, and the like. The nodes 101-108 within the IGP forward packets to respective destinations along the shortest path(s) to the destination. In the case of IP networks, the destination entries in the table would be IP prefixes such as the IP addresses of the nodes 101-108. In multiprotocol label switching (MPLS) networks, the shortest path LSPs (labelled Switched Paths) to destinations are set-up by LDP or SR (Segment Routing), which are based on the shortest path IP routes computed by the IGPs. In a Shortest Path Bridging (SPB) based Ethernet network, the shortest paths to various destination bridges are computed by IS-IS. Ethernet packets from a source bridge to a destination bridge are sent along the shortest path to the destination bridge.

In the illustrated embodiment, the nodes 101-108 build identical topology databases of the communication system 100 based on the flooded information. The topology is represented as a network graph constructed using the nodes 101-108 as vertices and the links as edges in the network graph. The nodes 101-108 independently compute paths to the destinations in the communication system 100, e.g., by running a Shortest Path Tree (SPT) algorithm on the topology represented by the network graph. Packets are therefore conveyed along the shortest path from a source to a destination through the network. The SPT algorithm guarantees that a first shortest path from a first node to the destination includes the shortest path from every transit node traversed by the first shortest path to the destination. Consequently, the paths determined by the SPT algorithm are coherent paths and the communication system 100 is a coherent network.

Multiple paths between endpoints can have the same total cost, in which case they are referred to as ECMP paths. In the illustrated embodiment, a first path 125 between the nodes 101 and 108 is represented by 101→102→104→106→108 and has a total cost of four. A second path 130 between the nodes 101 and 108 is represented by 101→103→105→107→108 and has a total cost of four, which is the same total cost as the first path 125. The first path 125 and the second path 130 are therefore ECMP paths between the nodes 101 and 108. The node 101 can therefore perform load balancing on packets that are transmitted from the node 101 to the node 108. Load-balancing is performed by computing a hash on one or more fields in a packet header or other characteristics of the packet. Either the first path 125 or the second path 130 is then chosen to convey the packet based on the hash value. The fields or characteristics that are used in the hashing algorithm are typically chosen so that the combination of fields or characteristics determines a "flow" associated with the packet. For example, in case of TCP/IP packets, the five-tuple={source address in IP header, destination address in IP header, IP protocol (TCP=6), source port in TCP header, destination port in TCP header} is used for the hash computation. This mode of load balancing ensures that packets belonging to a flow are forwarded on the same path to avoid out of the order delivery of packets at the destination.

Nodes along the first path 125 or the second path 130 make forwarding decisions for the packet based on a destination that is included in the packet or derived from the encapsulation in the packet. For example, if a packet is sent from the node 101 to the node 108 via the first path 125, the node 101 forwards the packet on the link 101→102. In response to receiving the packet, the node 102 looks up the shortest path to the node 108 (either in the packet encoding or using a forwarding table) and forwards the packet on the link 102→104. In response to receiving the packet, the node 104 looks up the shortest path to the node 108 and forwards the packet on the link 104→106. In response to receiving the packet, the node 106 looks up the shortest path to the node 108 and forwards the packet on the link 106→108. This approach is referred to as "destination-based routing" because each hop (e.g., the nodes 101, 102, 104, 106) forward the packet based on the packet's destination, e.g., the node 108.

Redundant explicit paths through a communication system can be configured based on packet fields or other characteristics of the packets. In explicit path routing, a node classifies the packets at ingress to the network into packet flows. Each packet flow is identified or determined based on predetermined fields in the packets or other characteristics of the packets. For the packet flow, an explicit path including a set of nodes and/or links is set up from the source node to a destination node. Packets belonging to the flow are sent along the explicit path. An explicit path computed for the flow may be based on Quality of Service (QoS) requirements of the flow and these explicit paths are called "traffic engineered (TE) paths." Explicit paths may be stateful as well as stateless. Stateful explicit paths are defined by state information stored in the nodes and stateless explicit paths are defined using information encoded into the packets so that the nodes are not required to maintain state for the explicit paths. Unlike shortest path routing, there could be any number of explicit paths between a source node and a destination node, each path set-up with certain QoS.

Figure 2:
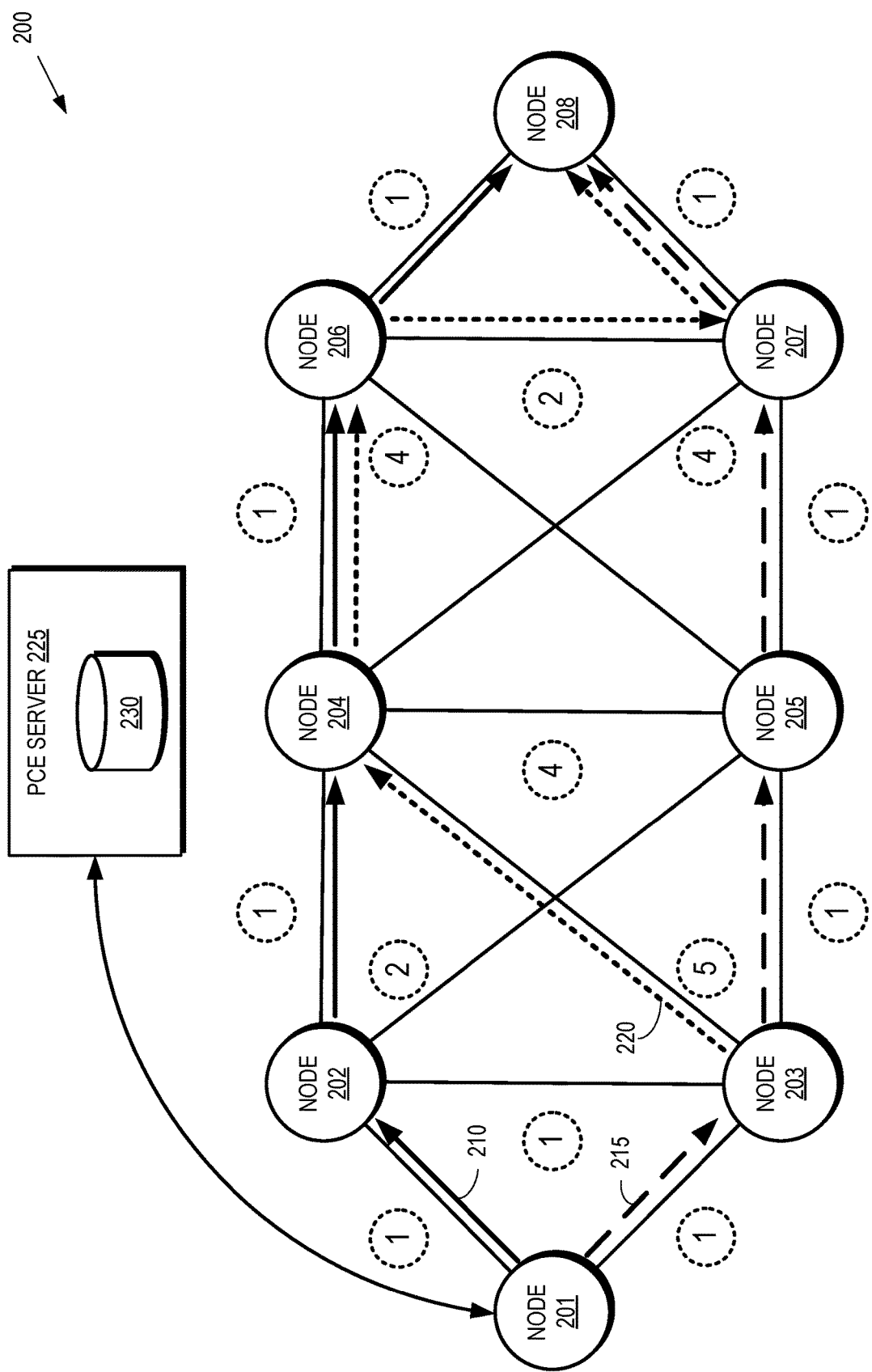
FIG. 2 is a block diagram of a communication system that implements redundant stateful explicit paths according to some embodiments.

FIG. 2 is a block diagram of a communication system 200 that implements redundant stateful explicit paths between a pair of source and destination nodes, according to some embodiments. The communication system 200 includes nodes 201, 202, 203, 204, 205, 206, 207, 208, which are collectively referred to herein as "the nodes 201-208." The paths between the nodes 201-208 in the communication system 200 are implemented as label switched paths (LSPs) that are determined using traffic engineering (TE). In the illustrated embodiment, the communication system 200 includes a first TE-LSP 210 and a second TE-LSP 215 between the nodes 201 and 208. A third TE-LSP 220 is formed between the nodes 203 and 208.

The nodes 201-208 and the associated links are assigned TE attributes such as available bandwidth, delay, color, infinity, and the like. For example, IGPs flood the TE attributes of the nodes 201-208 (and associated links) across the network and the nodes 201-208 build identical TE databases (TEDB) of the communication system 200. The ingress node of a TE-LSP (e.g., the node 201 for first TE-LSP 210 and the second TE-LSP 215 or the node 203 for the third TE-LSP 220) executes a Constraint Shortest Path First (CSPF) algorithm on TEDB with the QoS of the flow as the constraints. The CSPF generates an explicit path that meets the QoS requirements of the flow. The ingress node 201 signals the TE-LSP along the explicit path. The signalling messages also carry the QoS of the TE-LSP, so every node/link along the explicit path reserves the resources for the TE-LSP and updates the TE attributes (e.g., available bandwidth is subtracted by the bandwidth reserved by the TE-LSP), which in turn updates the TEDB across the network.

In the illustrated embodiment, computation of the TE-LSP is centralized in a path computation element (PCE) the server 225. The nodes 201-208 report their TE attributes and attributes of their adjacent links to the PCE server 225. The PCE server 225 maintains a TEDB 230 that stores the TE attributes for the nodes 201-208 and the associated links. Ingress nodes, such as the ingress node 201, send path computation requests to the PCE server 225 when they need to compute an explicit path with a specified QoS. The PCE server 225 computes the path using CSPF on the information stored in the TEDB 230 and returns the path to the ingress node.

Nodes along an explicit path allocate a label for the TE-LSP from its local label space and distribute the label to upstream nodes along the explicit paths during signaling of a TE-LSP. For example, if the label assigned to a node X for the first TE-LSP 210 is LX-1, the node 204 allocates a label L204-1 to the first TE-LSP 210 and distributes it upstream to the node 202. The node 204 also cross connects the incoming label L204-1 to the downstream label L206-1 (label advertised by the downstream node 206 of the LSP) on the link 204→206. To transmit a packet on the first TE-LSP 210, the ingress node 201 pushes a label L202-1 onto the packet and sends the packet on the link 201→202. The node 202 swaps the label L202-1 with the label L204-1 and transmits the packet on the link 202→204. In response to receiving the packet, the node 204 swaps the label L204-1 with the label L206-1 and transmits the packet on the link 204→206. In response to receiving the packet, the node 206 swaps the label L206-1 with the label L208-1 and transmits the packet on the link 206→208. In response to receiving the packet, the node 208 pops the label L208-1 and identifies itself as the egress node for the TE-LSP 210.

Figure 3:
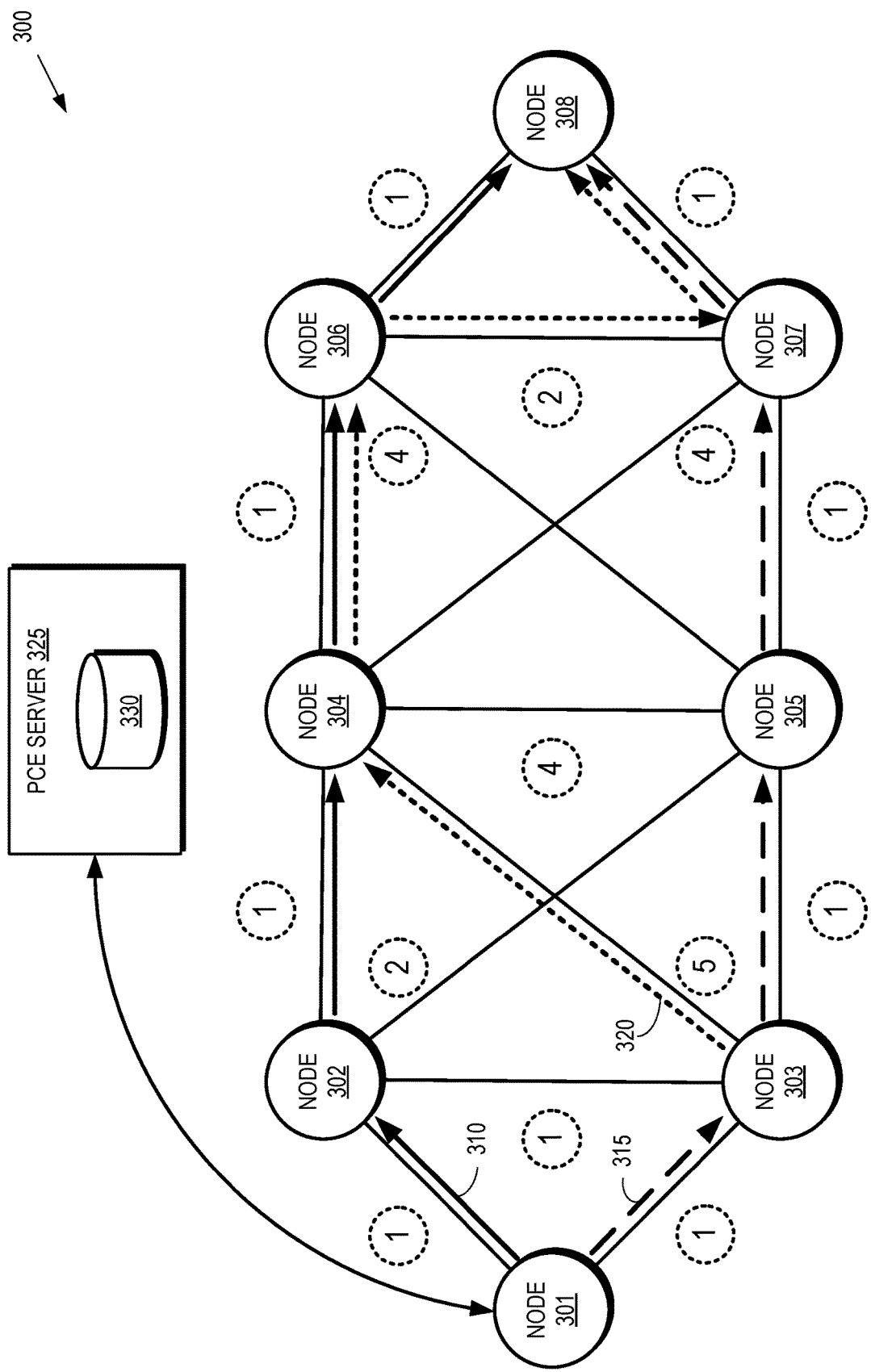
FIG. 3 is a block diagram of a communication system that implements redundant stateless explicit paths according to some embodiments.

FIG. 3 is a block diagram of a communication system 300 that implements redundant stateless explicit paths according to some embodiments. The communication system 300 includes nodes 301, 302, 303, 304, 305, 306, 307, 308, which are collectively referred to herein as "the nodes 301-308." The paths between the nodes 301-308 in the communication system 300 are implemented using segment routing (SR) in an MPLS data plane, which is an architecture for sending MPLS packets along a stateless explicit path. Each node, router, or link is assigned a label. A source router (e.g., the node 301) pushes a MPLS label stack onto the packet, wherein the label stack is the ordered list of labels assigned to the links/nodes in the explicit path. IPv4 and IPv6 specifications also include source routing support. In that scenario, a list of IP addresses is encoded into the packet. The list is an ordered list of IP addresses assigned to links/nodes in the explicit path.

A stateless explicit path is also called a source routed path. In this model, the nodes along the explicit path do not maintain states of the explicit path. Rather, the source node encodes the set of nodes/links of the explicit path into the packet itself. Each node along the path looks up the topmost entry in the set, pops the entry and forwards the packet to the next-hop link represented by the entry. In that way, the packet strictly traverses along the explicit path to the destination.

In the illustrated embodiment, the communication system 300 includes a first path 310 and a second path 315 between the nodes 301 and 308. The communication system 300 also includes a third path 320 between the nodes 303 and 308. In the illustrated embodiment, the paths 310, 315, 320 are determined by a PCE server 325 using information stored in a TEDB 330, e.g., TE attributes of the nodes 301-308. The PCE server 325 computes the paths 310, 315, 320 based on QoS requirements of the associated flow in response to path computation requests received from ingress nodes such as the node 301. In response to receiving the request, the PCE server 325 executes the CSPF algorithm on the TEDB 330 with the QoS of the flow as the constraints to generate an explicit path that meets the QoS of the flow. The PCE server 325 updates the TE attributes of the links/nodes along the path(s) in TEDB 330 by reserving the resources consumed by the path, e.g., the available bandwidth is subtracted in each node/link in the path by the bandwidth reserved the path. The PCE server 325 returns the path(s) to the ingress node 301. In the illustrated embodiment, the node 301 uses the first path 310 is a primary path and reserves the second path 315 as standby or backup path.

To transmit a packet along the first path 310, the node 301 encodes the source route {302→304, 304→306, 306→308} onto the packet. The first link 301→302 is not encoded because it is the immediate next hop of the nodes 301. The node 301 transmits the packet on the link 301→302. In response to receiving the packet, the node 302 pops the topmost entry 302→304 in the source route and identifies the link 302→304. The node 302 then forwards the packet with the encoded source route {304→306, 306→308}. In response to receiving the packet, the node 304 pops the topmost entry 304→306 in the source route and identifies the link 304→306. The node 304 then forwards the packet with the encoded source route {306→308}. In response to receiving the packet, the node 306 pops the topmost entry 306→308 in the source route and identifies the link 306→308. The node 306 then forwards the packet to the node 308.

Figure 4:
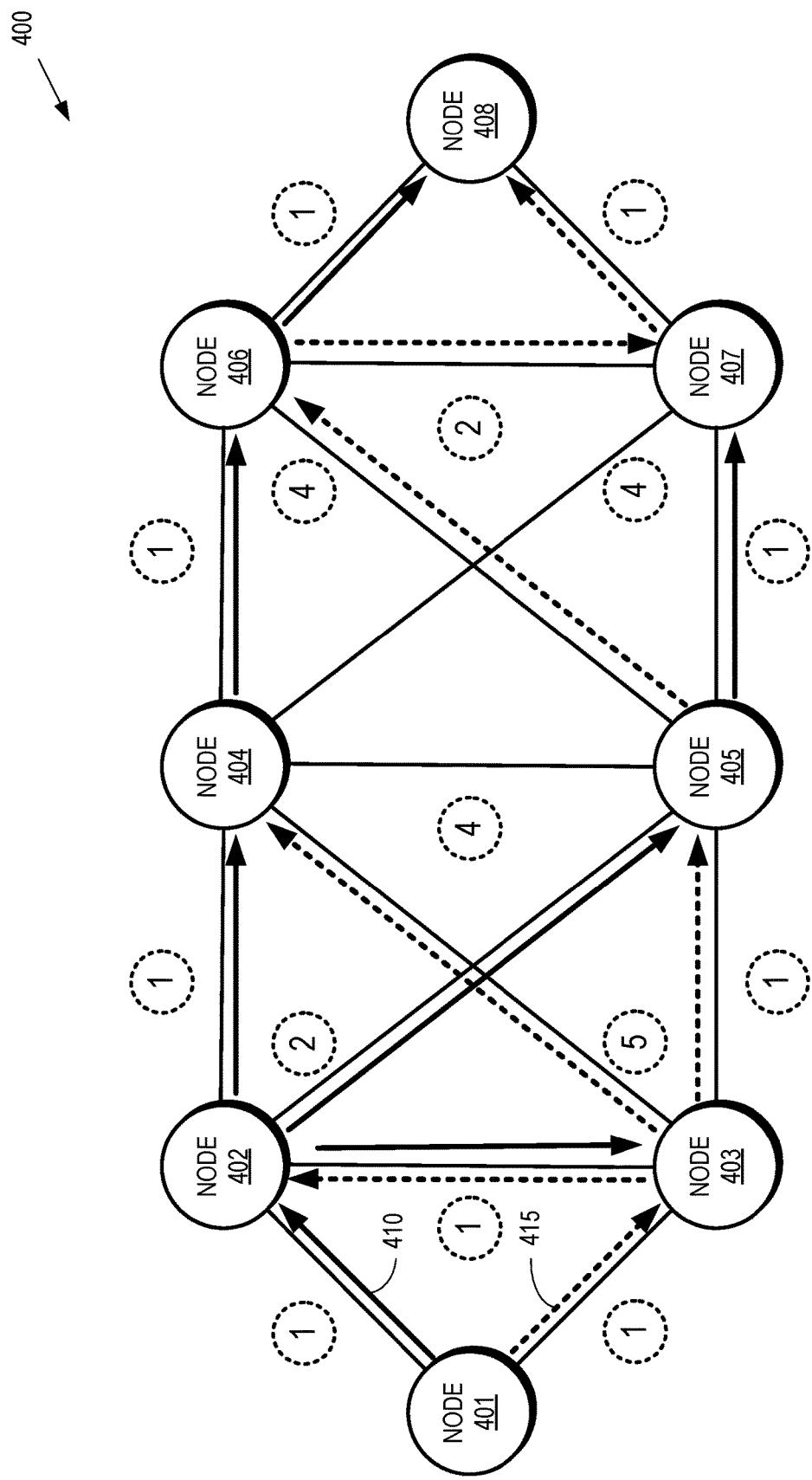
FIG. 4 is a block diagram of a communication system that implements randomized load-balancing (RLB) according to some embodiments.

FIG. 4 is a block diagram of a communication system 400 that implements randomized load-balancing (RLB) according to some embodiments. The communication system 400 includes nodes 401, 402, 403, 404, 405, 406, 407, 408, which are collectively referred to herein as "the nodes 401-408." Some embodiments of RLB are implemented as an alternative to shortest path routing and ECMP, as described herein.

A significant drawback to the shortest path routing paradigm is that all packets to a destination are forwarded along a common shortest path to the destination, i.e., all the packets in the flow traverse the same set of nodes and links along the path to the destination. Alternate paths to the destination remain unutilized or underutilized. Consequently, the shortest path may get overloaded, leading to congestion and packet drops. In addition, shortest paths to multiple destinations may share common links, which can exacerbate the congestion in shared links. Although ECMP mitigates the problem to a certain extent by load balancing packets to a destination along multiple equal cost shortest paths, ECMP suffers from following limitations:

In ECMP, a next-hop for a packet is chosen based on the flow associated with the packet. If a majority of the packets to a destination belong to the same flow then ECMP results is unfair load balancing.

ECMP is topology dependent and is not always possible in all network topologies. For example, in the topology in FIG. 4, the lowest-cost path from the node 401 to the node 408 is 401→402→404→406→408.

Even if ECMP is possible, the non-ECMP alternate paths to a destination remain unutilized.

In contrast, RLB supports load balancing of packets fairly across all possible paths to their destinations irrespective of the flows or characteristics of packets. Thus, RLB can be used for evenly load balancing traffic to a destination across all possible paths in the network to the destination, thereby guaranteeing optimal utilization of network resources, maximized throughput, and minimal congestion, which translates into better return of CAPEX/OPEX. Secondly, using RLB also supports even load balancing of traffic across the network irrespective of the destinations.

Some embodiments of the communication system 400 implement RLB in packet switched networks using maximally disjoint trees. The nodes 401-408 compute multiples of maximally disjoint trees and each tree connects every other node in the network. Maximally disjoint trees mean that directed edges among the trees are mutually exclusive. Note that although 402→403 and 403→402 are two directed edges of the same physical connection, they are mutually exclusive. For example, FIG. 4 describes two maximally disjoint trees: a first tree 410 (indicated by the solid line) and a second tree 415 (indicated by the dotted line) computed by node 401. Both the first tree 410 and the second tree 415 reach all other nodes 402-408 in the network.

A node performs RLB of packets by distributing the packets evenly over the maximally disjoint trees computed by the node. A packet is sent to its destination along a chosen tree by encoding the path to the destination in tree, into the packet itself. A transit node inspects the next-hop node in the path encoded in the packet and sends the packet to the next node in the path by performing RLB. The packet reaches the destination by traversing the path encoded by the source and this approach guarantees that packet does not encounter any loop during transit. Some embodiments of the node 401 perform RLB by sending the packets over the first tree 410 and the second tree 415 in round-robin fashion. The first tree 410 includes the set of links {401→402, 402→403, 402→404, 402→405, 404→406, 405→407, 406→408} and the second tree 415 includes the set of links {401→403, 403→402, 403→404, 403→405, 405→406, 406→407, 407→408}. A sequence of packets P1, P2, P3, and P4 would therefore be load balanced by node 401 by sending packet P1 over the first tree 410, packet P2 over the second tree 415, packet P3 over the first tree 410, and packet P4 over the second path 415. For example, if the destination of the packet P1 is the node 408, the node 401 encodes the packet with the path {402→404, 404→406, 406→408} along the tree 410.

Multipath networks share a significant drawback: the ingress node of the multipath network cannot be notified of congestion by one or more downstream transit nodes along the paths of packets transmitted from the ingress node. Consequently, the ingress node is unable to divert packets through alternate paths to mitigate the congestion. Instead, the ingress node continues to send packets along the congested path and the transit nodes experiencing congestion continue to drop or delay the packets despite the potential availability of alternate paths.

This problem is illustrated in FIG. 1 if node 104 is congested. Packets transmitted from the (ingress) node 101 to the egress node 108 along the path 125 are dropped or delayed at the congested node 104 even though the node 101 could divert packets onto the alternate path 130. Furthermore, since the communication system 100 uses shortest path routing based on the destination of the packet, transit nodes such as the node 104 only maintain state for the destination node 108. The node 104 is therefore unaware of the identity of the ingress node 101 and is unable to identify the path used by the packet transmitted from the node 101.

In the case of the explicit paths in the communication system 200 shown in FIG. 2, resources such as bandwidth are reserved along the TE-LSP during setup based on the associated QoS. For example, resources sufficient to support a predetermined QoS along the first TE-LSP 210 and the second TE-LSP 215 between the nodes 201 and 208 can be reserved during configuration of the paths. As long as the traffic along the first TE-LSP 210 adheres to the traffic profile associated with the QoS, the packets should not experience congestion. The node 201 can therefore perform policing or rate limiting of the packets sent over the first TE-LSP 210 to ensure that the traffic does not exceed the configured traffic profile. The third TE-LSP 220 shares the path 204→206 with the first TE-LSP 210. If the node 203 does not perform traffic policing or there is an error in the traffic policing that results in the third TE LSP 220 becoming oversubscribed, the resources of the path 204→206 can become oversubscribed. The transit nodes 204 and 206 do not perform independent traffic policing for these paths. Congestion on the oversubscribed path 204→206 causes packets to be delayed or dropped on both the first TE-LSP 210 and the third TE-LSP 220. However, the node 201 has a standby second TE-LSP 215 that is not being used and could be used to temporarily divert traffic from first TE-LSP 210 when path 204->206 is congested. The TE-LSPs 210, 215, 220 are stateful and of the node 204 is therefore aware of the identity of the ingress node 201 and the identifier of the first TE-LSP 210 and the third TE-LSP 220.

In the case of the source-routed paths in the communication system 300 shown in FIG. 3, resources are not reserved along the paths because the transit nodes are agnostic of the path, e.g., a stateless model is used by the transit nodes for the paths. As long as the traffic along the first path 310 adheres to the traffic profile associated with the QoS, the packets should not experience congestion. The node 301 can therefore perform policing or rate limiting of the packets sent over the first path 310 to ensure that the traffic does not exceed the traffic profile. The third path 320 shares the path 304→306 with the first path 310. If the node 303 does not perform traffic policing or there is an error in the traffic policing that results in the third path 320 becoming oversubscribed, the resources of the path 304→306 can become oversubscribed. The transit nodes 304 and 306 not perform independent traffic policing for these paths. Congestion on the oversubscribed path 304→306 causes packets to be delayed or dropped on both the first path 310 and the third path 320. However, the node 301 has a standby second path 315 that is not being used and could be used to temporarily divert traffic from the first path 310 when path 304->306 is congested. For source-routed packets, the node 304 forwards packets based on the topmost entry in an explicit path included in the packet. Thus, the node 304 is not aware of the identity of the (ingress) node 301 and is unable to identify the explicit path of the packet transmitted from the node 301.

In the case of RLB as implemented in the communication system 400 shown in FIG. 4, if a packet is sent along the first tree 410 using an encoded path {402→404, 404→406, 406→408} and the packet experiences congestion on the link 404→406, the node 404 drops the packet. The node 401 has an available alternate path via the second tree 415, which could be used to temporarily divert packets that are destined for the node 408. However, in RLB packets, the node 404 forwards the packet based on the topmost entry in the path included in the packet. Thus, the node 404 is unaware of the identity of the (ingress) node 401 and is unable to identify the path used by the packets transmitted by the node 401.

To mitigate or reduce congestion along a path in a multipaths network, a transit node sends a path congestion notification (path-CN) to notify the ingress node of the path that congestion has been detected in the transit node. In response to receiving the path-CN, the ingress node diverts the packets destined on the congested path through alternate paths until the congestion is mitigated. A transit node may also use the notification as an early alarm before reaching full congestion to avoid dropping of packets. As a result, throughput of the packets is improved with minimal or no packet drops. Path-CN messages can be used to notify ingress nodes of congestion in any kind of multi-path networks and irrespective of the packet switching technology, such as IP, MPLS, Ethernet or the like.

The process of generating and utilizing a path-CN message is summarized below:

1. An ingress node capable of sending traffic to a destination over multiple paths, allocates a locally unique "path identifier" (Path ID) to each path.
2. An ingress node allocates a network wide unique identifier (Node ID) that identifies itself.
3. Then for every packet sent along a path, the ingress node additionally encodes the tuple {Node ID, Path ID} into the packet. This tuple is referred to herein as the "Ingress Path."
4. A second node receiving a packet experiences a congestion while forwarding the packet. The second node determines whether the Ingress Path is encoded in the packet. If encoded, then the second node sends one or more path-CN messages(s) to the ingress node (identified by Node ID in the Ingress Path). The payload of the path-CN message carries the tuple {Path ID, <retry interval>}. Multiple path-CN messages may be sent to the ingress node since a path-CN message is typically sent on a connectionless, unreliable channel and so may be dropped by the network. In some embodiments, five path-CNs are sent to ingress node. The retry interval is an optional parameter that indicates to the ingress node a time interval after which ingress node may try resending packets on this path.
5. After sending the path-CN message to an ingress node, the second node creates a temporary state for the Ingress Path, called "Path Congestion State (PCS)" for a predetermined interval, which is referred to herein as the "monitoring interval." The monitoring interval is shorter than the retry interval. For example, if retry interval is 120 seconds then the monitoring interval could be five seconds. Maintaining the PCS for the monitoring interval suppresses further path-CN messages to the ingress node for subsequent packets that are inflight along that path. As long as the PCS is present, no path-CN messages are sent for the path by subsequent packets on that path. After expiry of monitoring interval, the PCS is deleted. Another path-CN message would be generated for a path only if packets continue to arrive after the monitoring interval has expired.
6. Ingress node receives a path-CN with {Path ID, <retry interval>} from the second node. If retry interval is not included in the path-CN, then the ingress node determines a retry interval by itself. The ingress node puts the path matching the Path ID in congested/unusable state for the {second node, retry interval}.
7. It may be possible that ingress node received path-CN for the path from a third node as well, because multiple nodes along a path may experience congestion while forwarding a packet along the path. Then ingress node also adds the state {third node, retry interval} into the congested state of the path.
8. When a Path ID is marked as congested/unusable, ingress node skips the path from sending any packet and rather uses the alternate paths.
9. At the expiry of retry interval on a path for all the congested nodes (e.g., second and third node), ingress node reverts back the path to usable state and starts sending packets along the path with the rule in step 3 above.
10. While a path is unusable, if all alternate paths fail or become congested/unusable, then ingress node may revert a path back to the usable state (before expiry of retry interval) to send packets to the destination along that path.

Figure 5:
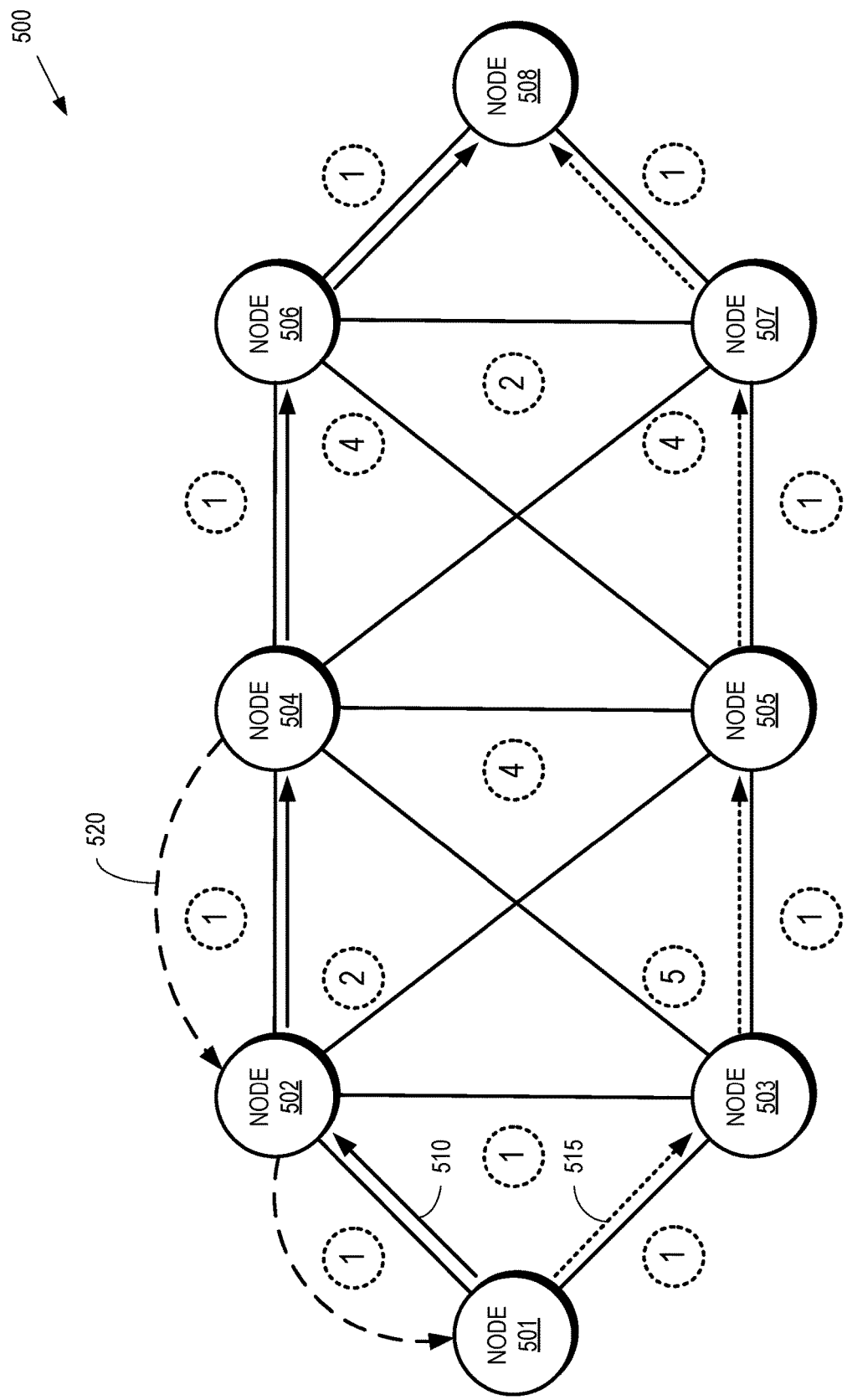
FIG. 5 is a block diagram of a communication system that generates path congestion notification (path-CN) messages for ECMP paths according to some embodiments.

FIG. 5 is a block diagram of a communication system 500 that generates path-CN messages for ECMP paths according to some embodiments. The communication system 500 includes nodes 501, 502, 503, 504, 505, 506, 507, 508, which are collectively referred to herein as "the nodes 501-508." The communication system 500 supports a first path 510 between the nodes 501 and 508 that is represented by the links 501→502→504→506→508 and a second path 515 between the nodes 501 and 508 that is represented by the links 501→503→505→507→508. The node 501 transmits packets to the node 508 along the first path 510. The packet is included within ingress path {Node ID=501, Path ID=1} that identifies the ingress node and the path used by the packet. In response to receiving the packet, the node 504 attempts to forward the packet along the link 504→506 but the node 504 determines that the link 504→506 is congested. The node 504 therefore sends a predetermined number (such as five) path-CN messages to the node 501 including the tuple {Path ID=1, retry interval=120 seconds}. The path-CN messages are transmitted along the notification path 520, which is indicated by the dashed line from the node 504 to the node 502 to the node 501. The node 504 also creates a PCS {Node ID=501, Path ID=1} that is maintained for a monitoring interval such as five seconds. Although transit routes do not maintain states in shortest path routing, the PCS is an ingress specific state that is a temporal state having a short duration and therefore does not violate the shortest path routing paradigm.

In response to receiving the path-CN from the node 504, the node 501 determines that the Path ID included in the path-CN message is mapped to the first path 510. The node 501 sets the first path 510 to an unusable state associated with {congested node=504, retry interval=120 seconds}. The first path 510 is therefore excluded from the ECMP set for the subsequent 120 seconds. Packets that are sent from the node 501 to the node 508 are hashed to the second path 515 so that packets addressed to the node 508 are forwarded on the second path 515.

Some embodiments of the communication system 500 are implemented as an IP network. The loopback IP address of a node (router) X is referred to as IP-X. For example, the loopback IP address of node 501 is IP-501. An IP packet sent by node 501 to node 508 is encoded with destination address IP-508 in IP header. However, the source address in the IP header may not be IP-501 because the node 501 is only an ingress node to the IP network and the node 501 may have received the IP packet from a source node that is located outside the communication system 500. Thus, while forwarding an IP packet on the first path 510, node 501 includes the Ingress Path={Node-ID=IP-501, Path-ID=1} in the packet. If the packet is an IPv4 packet, Ingress Path may be encoded as a new IPv4 Option. If the packet is an IPv6 packet, Ingress Path may be encoded as a new IPv6 Extension Header (EH).

When node 504 experiences congestion while forwarding the IP packet, the node 504 finds the Ingress Path={Node-ID=IP-501, Path-ID=1} encoded in the IP packet. Node 504 transmits a predetermined number of path-CN messages to node 501. A path-CN message is an IP packet with a source address and a destination address in the IP header of IP-504 and IP-501, respectively, with the payload that encodes the tuple {Path-ID=1, retry interval=120 seconds}. The payload may be encoded as Internet Control Message Protocol (ICMP). In response to receiving the path-CN from node 504, the node 501 sets the path 510 to unusable state for 120 seconds.

Some embodiments of the communication system 500 are implemented as an SPB network and the nodes 501-508 are bridges. Each node/bridge X is assigned a network wide unique MAC address MAC-X. For example, the MAC address of node 501 is MAC-501. In SPB, an Ethernet packet sent by node 501 to 508 is encoded with the outermost ethernet header with destination MAC address as MAC-508 and source MAC address as MAC-501. To forward the ethernet packet on the first path 510, node 501 includes the Ingress Path={Node-ID=MAC-501, Path-ID=1} into the packet. The Ingress Path may be appended to the outermost ethernet header with a new Ethertype value that indicates the presence of Ingress Path. If the ethernet frame includes VLAN tags, then Ingress Path should be appended after the VLAN tags. The Ingress Path also includes the Ethertype value that indicates the payload type of the ethernet packet (e.g., IP, MPLS, and the like).

In response to detecting congestion while forwarding the ethernet packet, the node 504 finds the Ingress Path={Node-ID=MAC-501, Path-ID=1} encoded in the IP packet. Node 504 sends a predetermined number (such as five) path-CN messages to node 501 via the notification path 520. Some embodiments of the path-CN message are implemented as an ethernet packet with a source address and a destination address in the ethernet header as MAC-504 and MAC-501, respectively, with the payload that encodes the tuple {Path-ID=1, retry interval=120 seconds}. The payload may be encoded with a new Ethertype value for path-CN. In response to receiving the path-CN from node 504, the node 501 sets the first path 510 in unusable state for the retry interval, e.g., 120 seconds.

Figure 6:
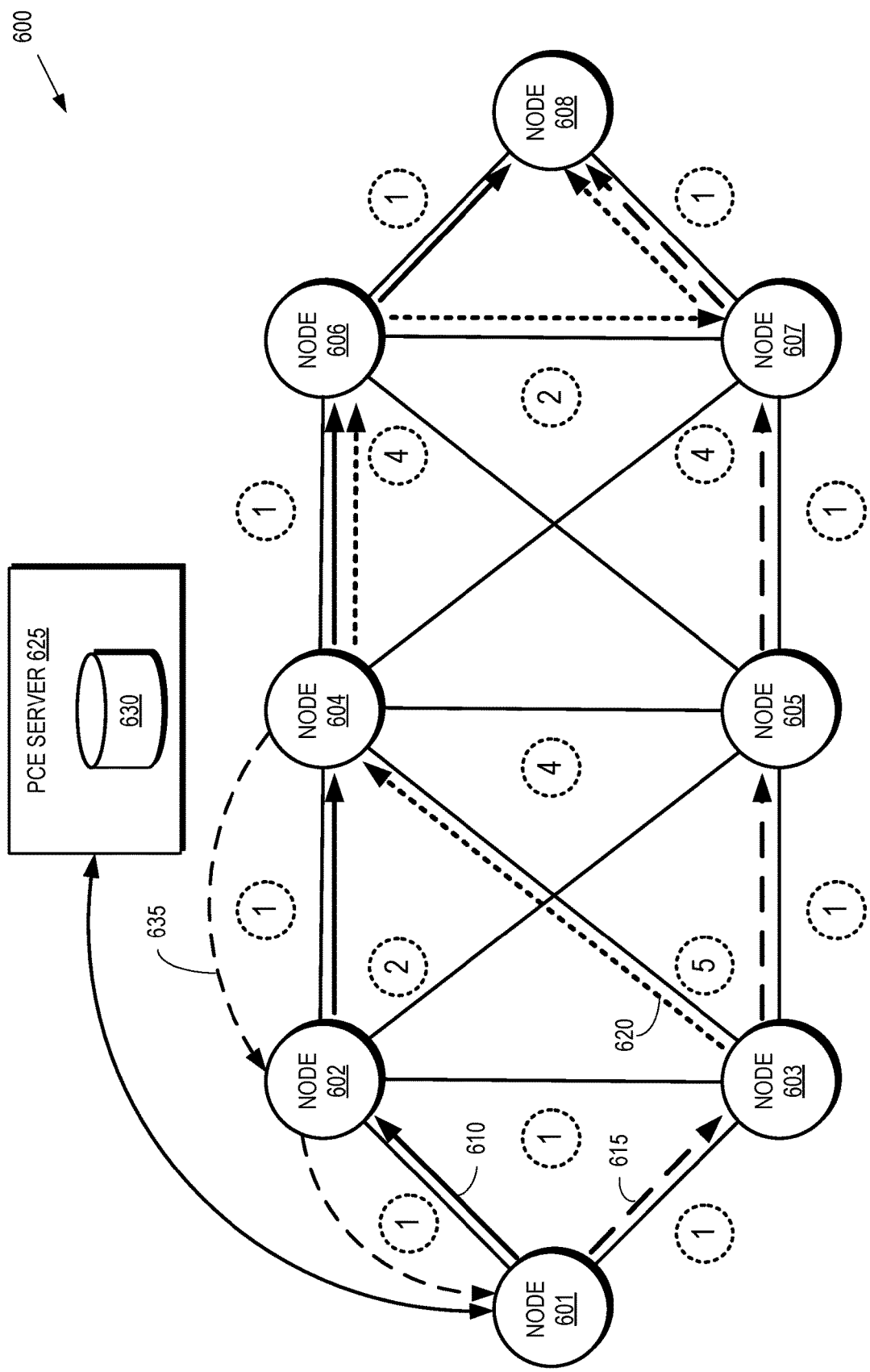
FIG. 6 is a block diagram of a communication system that transmits path-CN messages associated with redundant stateful explicit paths according to some embodiments.

FIG. 6 is a block diagram of a communication system 600 that transmits path-CN messages associated with redundant stateful explicit paths according to some embodiments. The communication system 600 includes nodes 601, 602, 603, 604, 605, 606, 607, 608, which are collectively referred to herein as "the nodes 601-608." In the illustrated embodiment, the communication system 600 includes a first TE-LSP 610 and a second TE-LSP 615 between the nodes 601 and 608. A third TE-LSP 620 is formed between the nodes 603 and 608. In the illustrated embodiment, computation of the TE-LSP is centralized in a PCE server 625. The nodes 601-608 report their TE attributes and attributes of their adjacent links to the PCE server 625. The PCE server 625 maintains a TEDB 630 that stores the TE attributes for the nodes 601-608 and the associated links. Ingress nodes, such as the ingress node 601, send path computation requests to the PCE server 625 when they need to compute an explicit path with a specified QoS. The PCE server 625 computes the path using CSPF on the information stored in the TEDB 630 and returns the path to the ingress node.

The TE-LSPs are stateful across their respective paths so the nodes 601-608 maintain control plane and data plate state information for the LSPs. The control plane state at each node 601-608 and a uniquely identifies the LSP with an equivalent of the Ingress Path. The identification of the LSP is dependent on the control protocol used to set up the TE-LSPs 610, 615, 620. For example, if RSVP-TE is the signaling protocol, then and LSP is signaled with {Source Object, Tunnel ID}, which are defined as:

Source Object=an IP address of the ingress node=Node-ID

Tunnel-ID=a numeric integer assigned to the LSP by ingress node=Path-ID.

Thus, the Ingress Path does not need to be explicitly encoded in the packets that are sent on the TE-LSPs 610, 615, 620.

In response to detecting congestion on the TE-LSP 610, the node 604 looks up control plane state information for the packet and obtains the Source Object and the Tunnel ID. The node 604 sends a predetermined number (such as five) of path-CN messages to the node 601. The path-CN messages are transmitted along a notification path 635, which is indicated by the dashed arrow from the node 604 to the node 602 to the node 601. Some embodiments of the path-CN message are encoded as an IP packet with a source address IP-604 and a destination address IP-601 in the IP header and a payload that encodes the tuple {Path ID=Tunnel ID, retry interval=120 seconds}. The payload can be included as an ICMP packet that indicates the path-CN for a tunnel so that the Path ID is interpreted in the context of the tunnel. In response to receiving the path-CN from the node 604, the node 601 sets the TE-LSP 610 to unusable state for the retry interval (e.g., for 120 seconds) and diverts subsequent packets to the TE-LSP 615.

Figure 7:
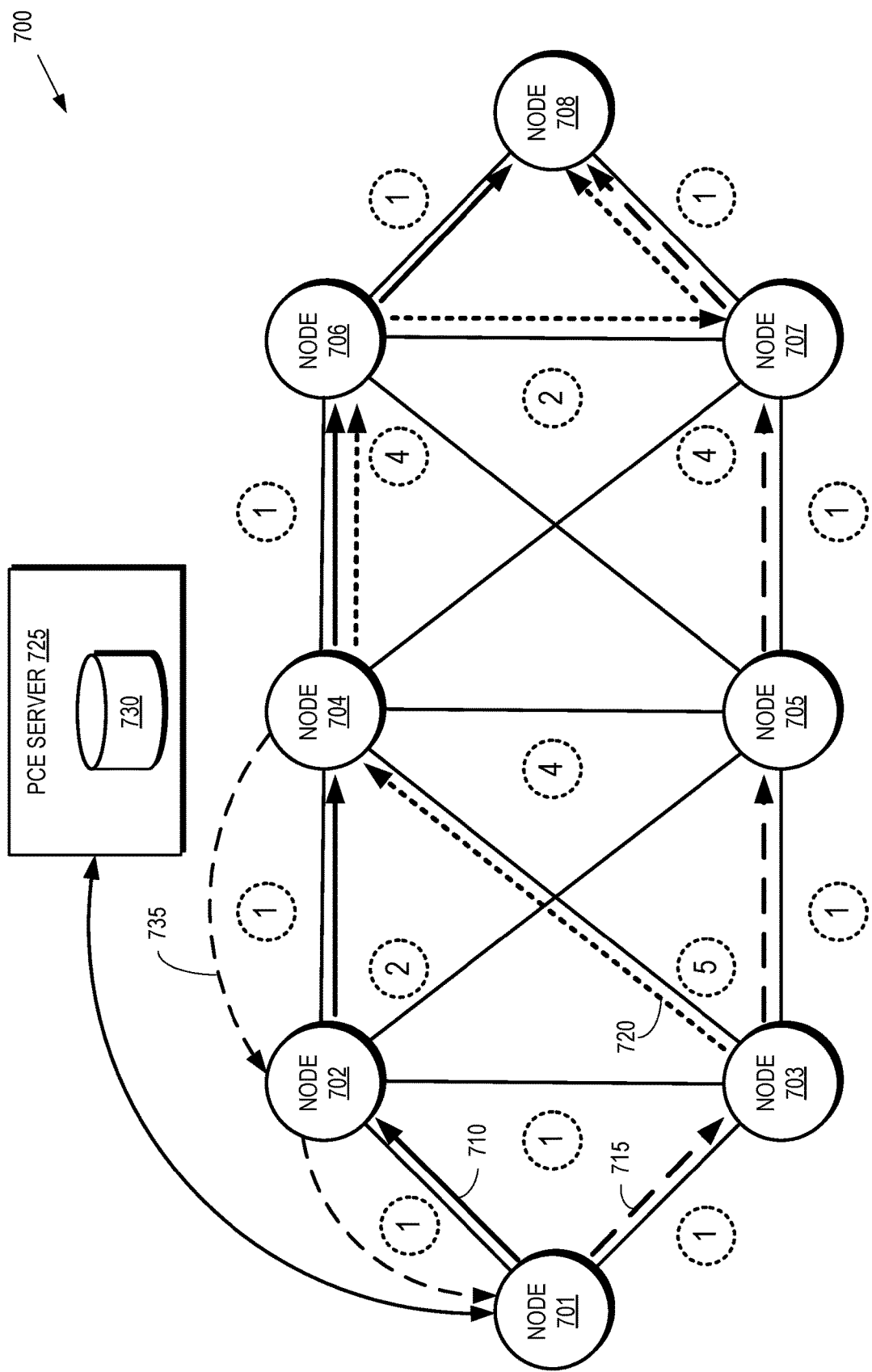
FIG. 7 is a block diagram of a communication system that transmits path-CN messages associated with redundant stateless explicit paths according to some embodiments.

FIG. 7 is a block diagram of a communication system 700 that transmits path-CN messages associated with redundant stateless explicit paths according to some embodiments. The communication system 700 includes nodes 701, 702, 703, 704, 705, 706, 707, 708, which are collectively referred to herein as "the nodes 701-708." In the illustrated embodiment, the communication system 700 includes a first path 710 and a second path 715 between the nodes 701 and 708. A third path 720 is formed between the nodes 703 and 708. In the illustrated embodiment, computation of the paths is centralized in a PCE server 725. The nodes 701-708 report their TE attributes and attributes of their adjacent links to the PCE server 725. The PCE server 725 maintains a TEDB 730 that stores the TE attributes for the nodes 701-708 and the associated links. Ingress nodes, such as the ingress node 701, send path computation requests to the PCE server 725 when they need to compute an explicit path. The PCE server 725 computes the path using CSPF on the information stored in the TEDB 730 and returns the path to the ingress node.

To transmit a packet along the first path 710, the node 701 encodes the source route {702→704, 704→706, 706→708} onto the packet. The node 701 also appends the Ingress Path={Node ID=701, Path ID=1} to the source route that is encoded into the packet. The node 701 transmits the packet on the link 701→702. In the illustrated embodiment, the node 704 experiences congestion while forwarding the packet on the link 704→706. In response to detecting the congestion, the node 704 identifies the Ingress Path={Node ID=701, Path ID=1} that is appended to the source route in the packet. The node 704 then sends a predetermined number (such as five) path-CN messages to the node 701. The path-CN messages include a payload that includes the tuple {Path ID=1, retry interval=120 seconds}. The path-CN messages are transmitted along a notification path 735, which is indicated by the dashed arrow from the node 704 to the node 702 to the node 701. In response to receiving the path-CN messages, the node 701 sets the first path 710 to an unusable state for the retry interval of 120 seconds. Subsequent packets are therefore diverted from the first path 710 to the second path 715.

Some embodiments of the communication system 700 are implemented as an IP network. For a link X→Y, the IP address at the end of Y is denoted as IP-X/Y. For example, IP address of 704→706 is IP-704/706. To send a packet along the first path 710, the node 701 encodes the IP source route {IP-702/704, IP-704/706, IP-706/708}. If the communication system 700 operates according to IPv4, then the source route is encoded with the SSR (Strict Source Route) Option defined in the IPv4 standards. An IPv4 source route may be also encoded as a LSR (Loose Source Route) Option defined in the IPv4 standards, if the source route includes a "loose hop", which means the source route includes IPv4 address of a router instead of a strict link. The ingress path={Node-ID=IP-701, Path-ID=1} is appended to the SSR option as the Ingress Path Option. If the communication system 700 operates according to IPv6, then the source route is encoded with the Routing EH defined in the IPv6 standards. The ingress path={Node-ID=IP-701, Path-ID=1} is chained to the Routing EH as the Ingress Path EH.

In response to detecting congestion while forwarding a source-routed IP packet, the node 704 finds the Ingress Path={Node-ID=IP-701, Path-ID=1} encoded in the IP packet. The node 704 then transmits a predetermined number (such as five) of path-CN messages to node 701. The path-CN message is an IP packet with source address and destination address in the IP header as IP-704 and IP-701, respectively, with the payload that encodes the tuple {Path-ID=1, retry interval=120 seconds}. The payload may be encoded as ICMP. In response to receiving the path-CN message, the node 701 sets the first path 710 to an unusable state for the retry interval of 120 seconds. Subsequent packets are therefore diverted from the first path 710 to the second path 715.

Figure 8:
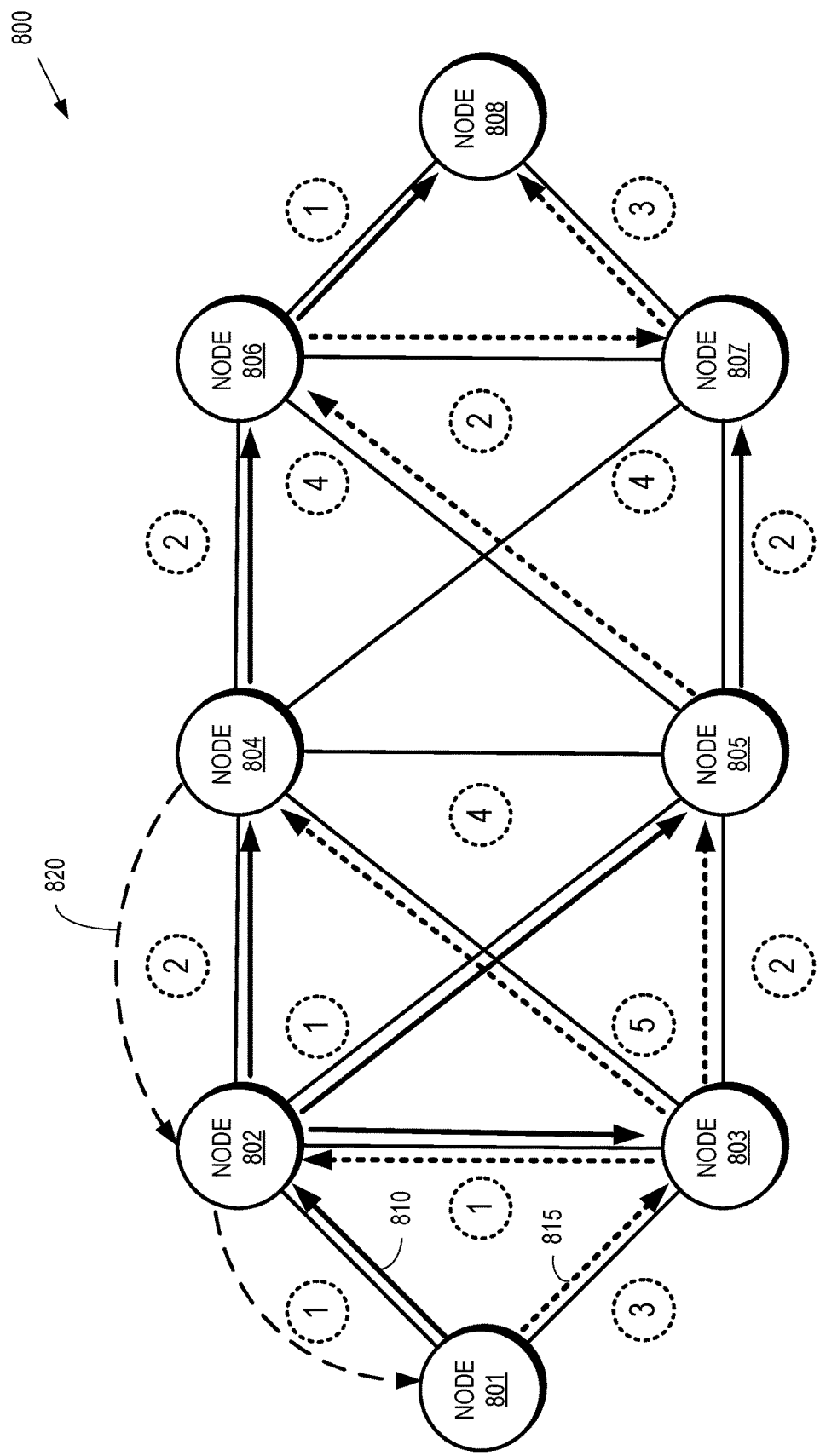
FIG. 8 is a block diagram of a communication system that transmits path-CN messages associated with RLB paths according to some embodiments.

FIG. 8 is a block diagram of a communication system 800 that transmits path-CN messages associated with RLB messaging according to some embodiments. The communication system 800 includes nodes 801, 802, 803, 804, 805, 806, 807, 808, which are collectively referred to herein as "the nodes 801-808." The communication system 800 includes two maximally disjoint trees: a first tree 810 that includes the set of links {801→802, 802→803, 802→804, 802→805, 804→806, 805→807, 806→808} and a second tree 815 includes the set of links {801→803, 803→802, 803→804, 803→805, 805→806, 806→807, 807→808}.

The node 801 assigns a locally unique Path ID to each path that originates from the node 801. In the illustrated embodiment, there are seven paths on each tree, one to each of the destination nodes 802-808. Since there are two trees 810, 815, there are 14 paths altogether and unique Path IDs can be assigned to each of them. For example, the Path ID assigned to the path from the node 801 to the node 808 in the first tree 810 is given the value 1 and the Path ID assigned to the path from the node 801 to the node 808 in the second tree 815 is given the value 2. To send a packet to the node 808 along the first tree 810, the node 801 encodes a source route {802→804, 804→806, 806→808} into the packet. The node 801 also appends the Ingress Path={Node ID=801, Path ID=1} to the source route and sends the packet on the link 801→802.

In response to detecting congestion while forwarding the packet on the link 804→806, the node 804 detects the Ingress Path={Node ID=801, Path ID=1} appended to the source route. The node 804 then transmits a predetermined number (such as five) of path-CN messages to the node 801 including a payload that includes the tuple {Path ID=1, retry interval=120 seconds}. The path-CN messages are transmitted along a notification path 820, which is indicated by the dashed arrow from the node 804 to the node 802 to the node 801. In response to receiving the path-CN messages, the node 801 sets the path to the node 808 along the first tree 810 to an unusable state for the retry interval of 120 seconds. Subsequent packets are therefore diverted from the first path 810 to the second path 815.

Some embodiments of the communication system 800 are implemented as an IP network. For a link X→Y, the IP address at the end of Y is denoted as IP-X/Y. For example, IP address of 804→806 is IP-804/806. To send a packet along the path using the first tree 810, the node 801 encodes the IP source route {IP-802/804, IP-804/806, IP-806/808}. If the communication system 800 operates according to IPv4, then the source route is encoded with the SSR (Strict Source Route) Option defined in the IPv4 standards. An IPv4 source route may be also encoded as a LSR (Loose Source Route) Option defined in the IPv4 standards, if the source route includes a "loose hop", which means the source route includes IPv4 address of a router instead of a strict link. The ingress path={Node-ID=IP-801, Path-ID=1} is appended to the SSR option as the Ingress Path Option. If the communication system 800 operates according to IPv6, then the source route is encoded with the Routing EH defined in the IPv6 standards. The ingress path={Node-ID=IP-801, Path-ID=1} is chained to the Routing EH as the Ingress Path EH.

In response to detecting congestion while forwarding a source-routed IP packet, the node 804 finds the Ingress Path={Node-ID=IP-801, Path-ID=1} encoded in the IP packet. The node 804 then transmits a predetermined number (such as five) of path-CN messages to node 801. The path-CN message is an IP packet with source address and destination address in the IP header as IP-804 and IP-801, respectively, with the payload that encodes the tuple {Path-ID=1, retry interval=120 seconds}. The payload may be encoded as ICMP. In response to receiving the path-CN message, the node 801 sets the first path 810 to an unusable state for the retry interval of 120 seconds. Subsequent packets are therefore diverted from the first path 810 to the second path 815.

Figure 9:
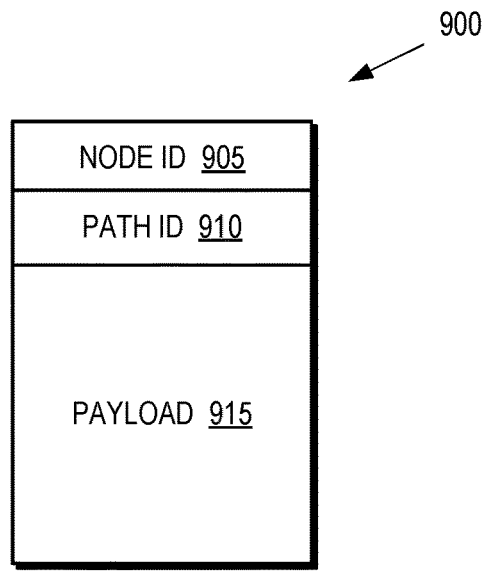
FIG. 9 is a block diagram of a packet transmitted by an ingress node according to some embodiments.

FIG. 9 is a block diagram of a packet 900 transmitted by an ingress node according to some embodiments. The packet 900 is transmitted by some embodiments of the node 501 shown in FIG. 5, the node 601 shown in FIG. 6, the node 701 shown in FIG. 7, and the node 801 shown in FIG. 8. The packet 900 includes a node identifier (Node ID) 905 that is appended to the packet 900 by an ingress node for the packet 900. The packet 900 also includes a path identifier (Path ID) 910 that is a locally unique identifier of the path chosen by the ingress node to transmit the packet 900 to a destination. The packet 900 also includes a payload 915.

Figure 10:
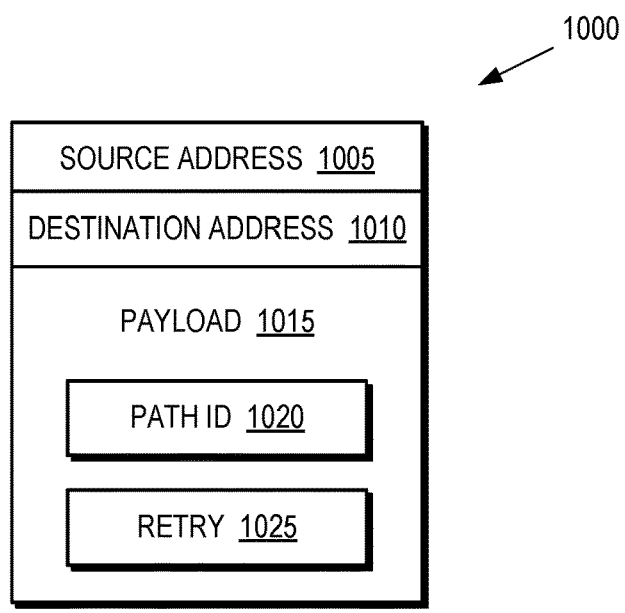
FIG. 10 is a block diagram of a path-CN message that is transmitted by a transit node to an ingress node in response to detecting congestion according to some embodiments.

FIG. 10 is a block diagram of a path-CN message 1000 that is transmitted by a transit node in response to detecting congestion according to some embodiments. The path-CN message 1000 is transmitted by some embodiments of the nodes in the communication system 500 shown in FIG. 5, the communication system 600 shown in FIG. 6, the communication system 700 shown in FIG. 7, and the communication system 800 shown in FIG. 8. The transit node receives a packet from an ingress node such as the packet 900 shown in FIG. 9. In response to detecting congestion, the transit node generates the path-CN message 1000 based on the information included in the packet received from the ingress node. The path-CN message 1000 includes a source address 1005 that identifies the transit node and a destination address 1010 that identifies the ingress node. The destination address 1010 is determined using the node ID included in the packet received from the ingress node. A payload 1015 of the path-CN message 1000 includes a path ID 1020 that was appended to the packet received from the ingress node. In some embodiments, the payload 1015 also includes information indicating a retry interval 1025 that indicates how long the ingress node should wait before making another attempt to transmit a packet along the path indicated by the path ID 1020.

Figure 11:
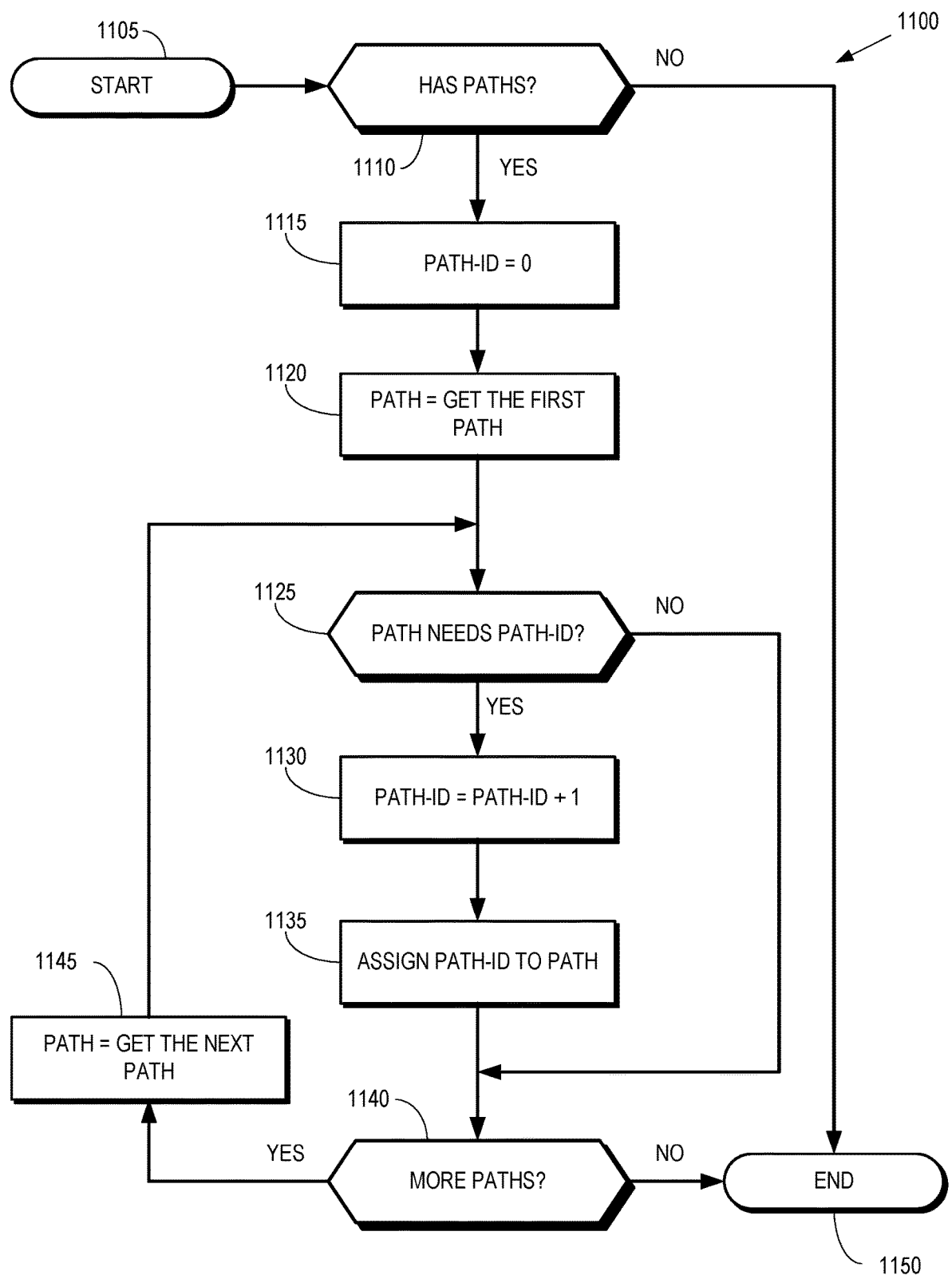
FIG. 11 is a flow diagram of a method of configuring an ingress node to support notification of congestion using path-CN messages according to some embodiments.

FIG. 11 is a flow diagram of a method 1100 of configuring an ingress node to support notification of congestion using path-CN messages according to some embodiments. The method 1100 is implemented in some embodiments of the communication system 500 shown in FIG. 5, the communication system 600 shown in FIG. 6, the communication system 700 shown in FIG. 7, and the communication system 800 shown in FIG. 8.

The method 1100 begins at the block 1105. At block 1110, the ingress node determines whether there are any paths originating from the ingress node. The paths can include ECMP paths, TE-LSP's, stateless explicit paths, RLB paths, and the like. If the ingress node does not identify any paths, the method 1100 flows to the block 1150 and the method 1100 ends. Otherwise, the method 1100 flows to the block 1115.

At block 1115, the ingress node initializes the local variable Path ID to a predetermined value such as 0. The local variable Path ID is used to increment and assign locally unique path identifiers to each path from the ingress node. At block 1120, the ingress node retrieves the first path from the node.

At decision block 1125, the ingress node determines whether the new path needs a path identifier. If not, the method 1100 flows to the decision block 1140. For example, if the path is a stateful TE-LSP signals according to a corresponding protocol, then an equivalent of the Ingress Path has already been signaled in the TE-LSP and there is no need to assign a path identifier. If the path needs a new path identifier, the method 1100 flows to the block 1130.

At block 1130, the ingress node increments the local variable Path ID by a predetermined value such as 1. At block 1135, the ingress notice assigns the incremented value of the Path ID to the path.

At decision block 1140, the ingress node determines whether there are more paths available to the ingress node. If there are additional paths, the method 1100 flows to the block 1145 and the ingress node retrieves the next path available to the ingress node. The method 1100 then flows back to the decision block 1125. If there are no additional paths available to the ingress node, the method 1100 flows to the block 1150 and the method 1100 ends.

Figure 12:
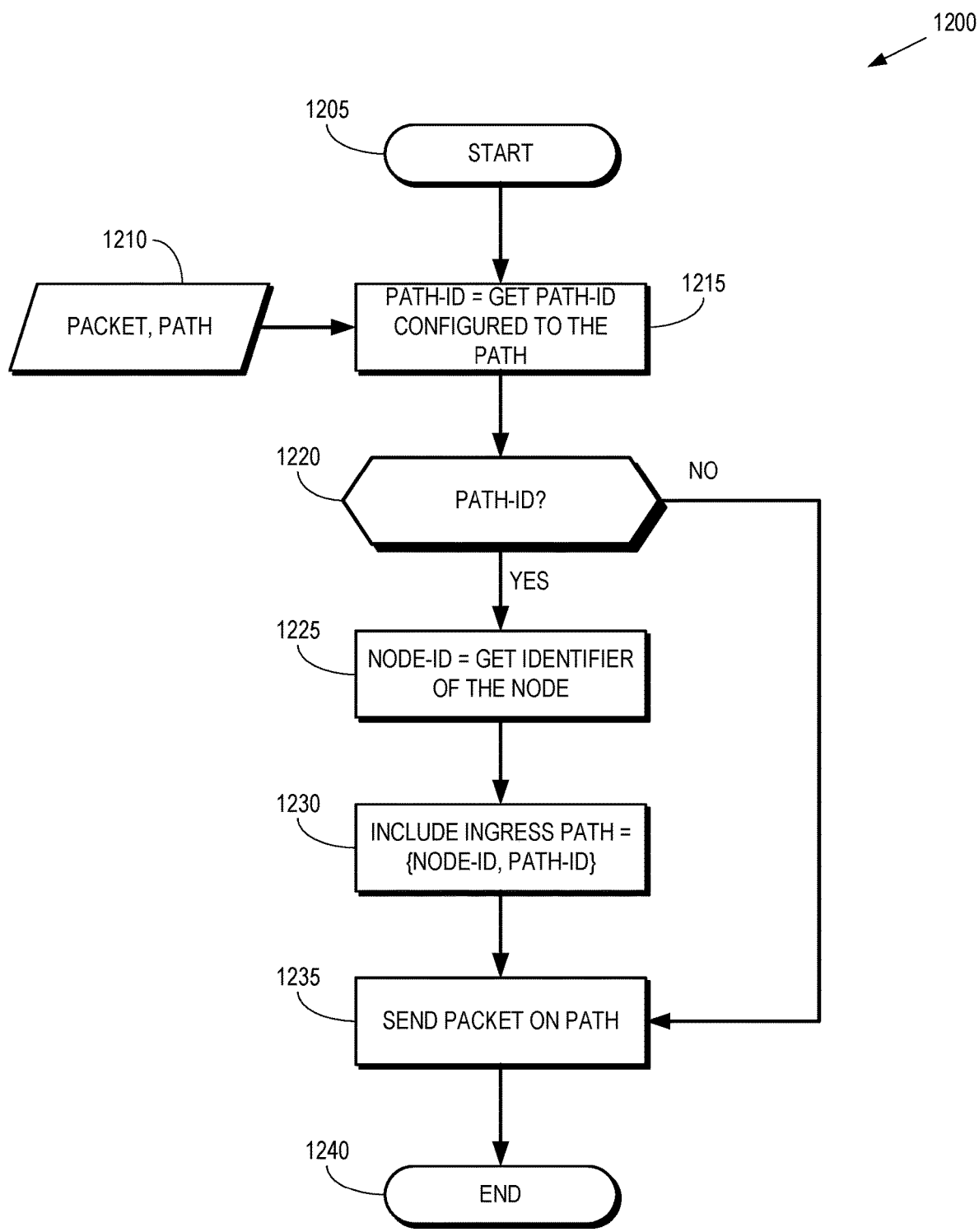
FIG. 12 is a flow diagram of a method for transmitting a packet on a path from an ingress node according to some embodiments.

FIG. 12 is a flow diagram of a method 1200 for transmitting a packet on a path from an ingress node according to some embodiments. The method 1200 is implemented in some embodiments of the communication system 500 shown in FIG. 5, the communication system 600 shown in FIG. 6, the communication system 700 shown in FIG. 7, and the communication system 800 shown in FIG. 8.

The method 1200 begins at the block 1205. Input 1210 to the method 1200 includes a packet to be sent on the path. In the illustrated embodiment, the packet is already encoded with the encapsulations required to send the packet on the path. The input 1210 also includes information indicating the path on which the ingress node transmits the packet.

At block 1215, the ingress node retrieves the Path ID that is configured on the path. At decision block 1220, the ingress node determines whether the Path ID has a valid value such as a nonzero value. If the Path ID is invalid, the Ingress Path is not to be encoded into the packet, e.g., either because the path is a stateful TE-LSP or there is no multipath support. The method 1200 therefore flows to the block 1235. If the path ID is valid, the method 1200 flows to the block 1225.

At block 1225, the ingress node retrieves a network-wide identifier of the node (Node ID). At block 1230, the ingress node includes the Ingress Path into the packet, e.g., by encoding a tuple including the Node ID and Path ID into the packet. At block 1235, the ingress node transmits the packet along the path. The method 1200 ends at the block 1240.

Figure 13:
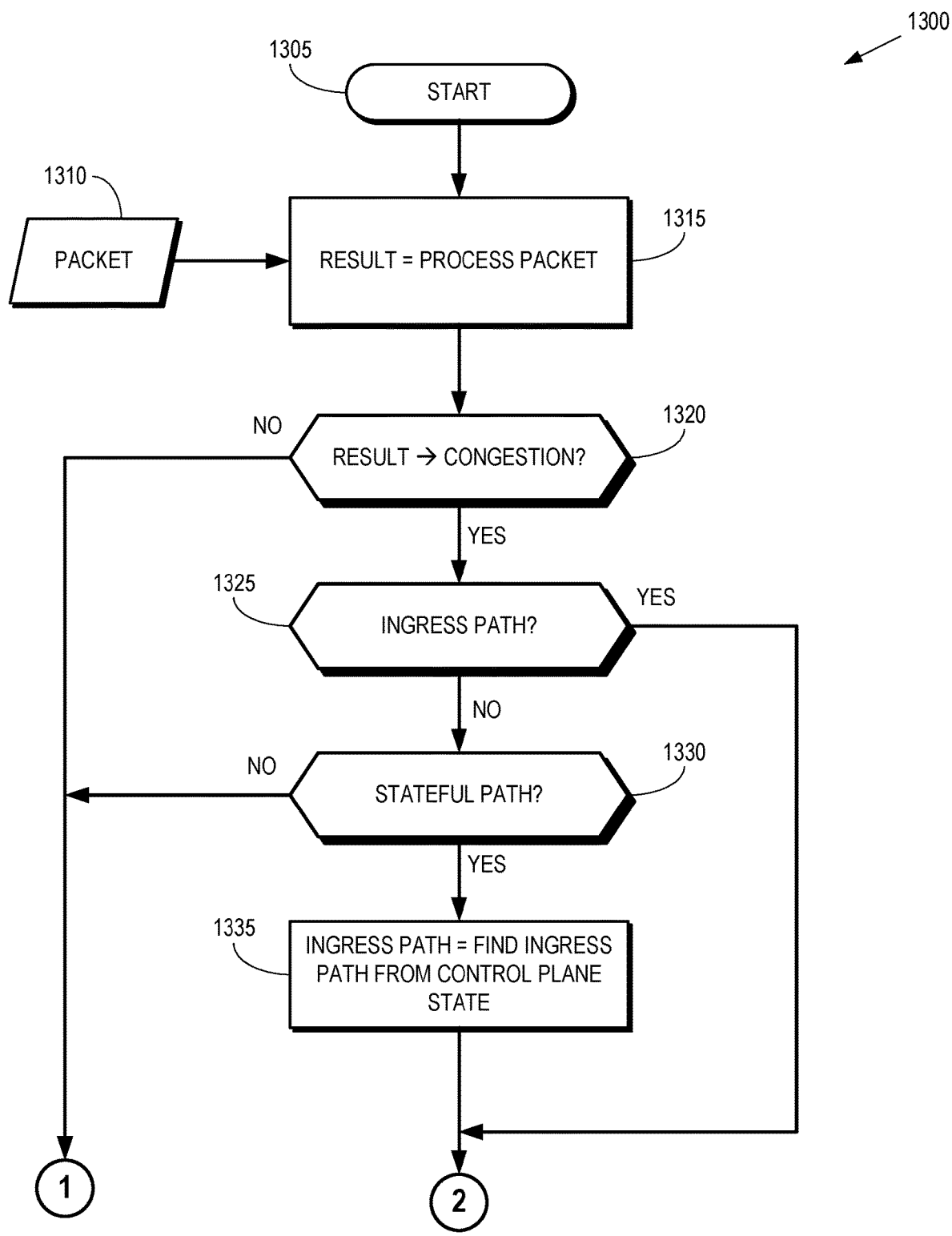
FIG. 13 is a flow diagram of a first portion of a method for processing a packet received by a transit node on a path from an ingress node according to some embodiments.

FIG. 13 is a flow diagram of a first portion of a method 1300 for processing a packet received by a transit node on a path from an ingress node according to some embodiments. The method 1300 is implemented in some embodiments of the communication system 500 shown in FIG. 5, the communication system 600 shown in FIG. 6, the communication system 700 shown in FIG. 7, and the communication system 800 shown in FIG. 8.

The method 1300 begins at the block 1305. Input 1310 to the method 1300 includes the packet received by the transit node on the path from the ingress node.

At block 1315, the transit node performs processing required for forwarding of the packet based on the type of the packet. The transit node also evaluates the congestion status and the forwarding context of the packet.

At decision block 1320, the transit node determines whether there is congestion along the forwarding context of the packet. If not, the method 1300 flows to the node 1, which connects to the decision block 1430 in FIG. 14. If the transit node experiences congestion along the forwarding context, the method 1300 flows to the decision block 1325.

At decision block 1325, the transit node determines whether the packet includes information indicating an Ingress Path. If the Ingress Path is included in the packet, the method 1300 flows to the node 2, which connects to the decision block 1405 in FIG. 14. Otherwise, the method 1300 flows to the decision block 1330.

At decision block 1330, the transit node determines whether the packet has been received over a stateful path. If not, the method 1300 flows to the node 1, which connects to the decision block 1430 in FIG. 14. If the packet is received over a stateful path, the method 1300 flows to the block 1335 and the transit node derives the Ingress Path from control plane state of the exquisite path. The method 1300 then flows to the node 2, which connects to the decision block 1405 in FIG. 14.

Figure 14:
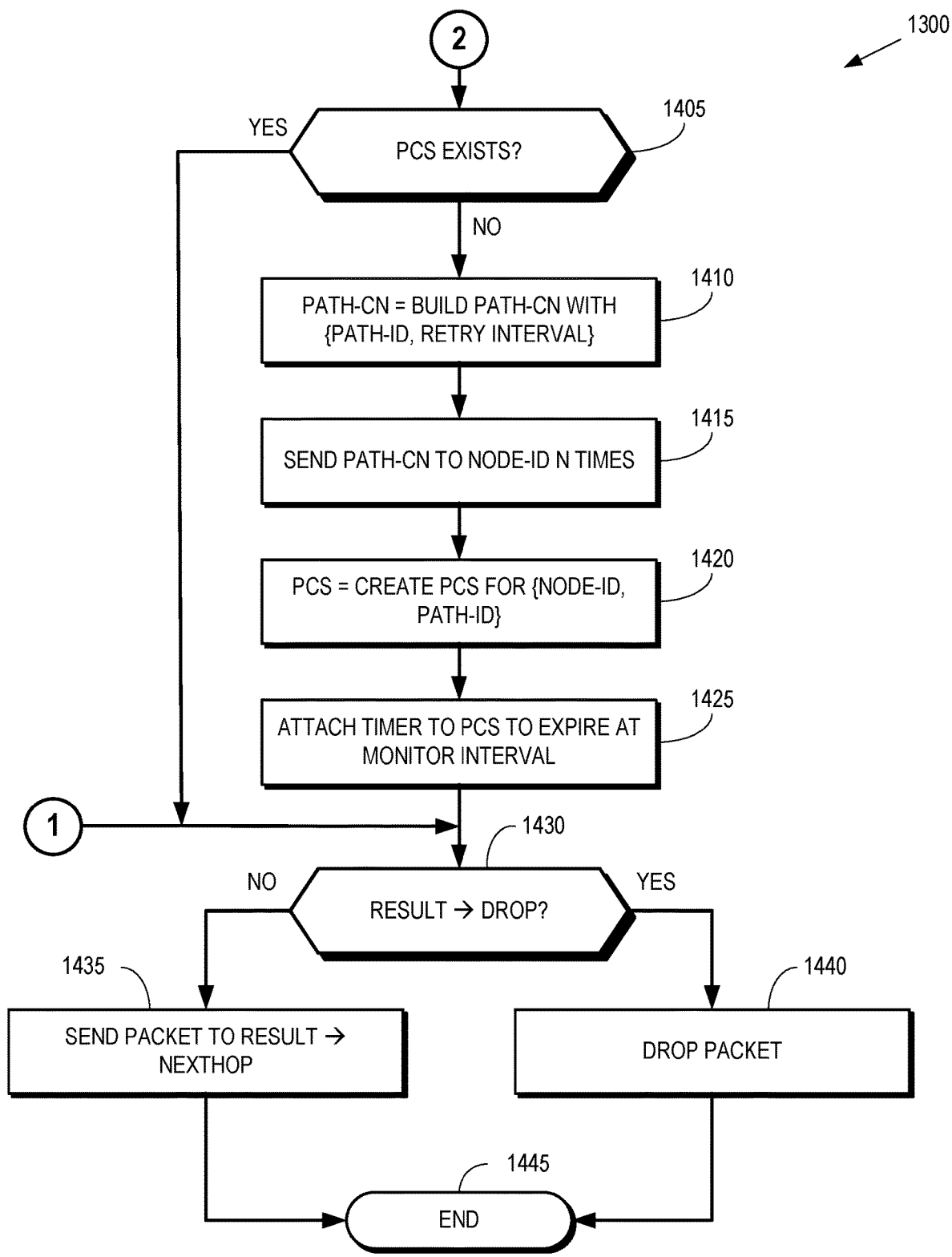
FIG. 14 is a flow diagram of a second portion of the method for processing a packet received by a transit node on a path from an ingress node according to some embodiments.

FIG. 14 is a flow diagram of a second portion of the method 1300 for processing a packet received by a transit node on a path from an ingress node according to some embodiments. The decision block 1405 is connected to the first portion of the method 1300 shown in FIG. 13 via the node 2. The decision block 1430 is connected to the first portion of the method 1300 shown in FIG. 13 via the node 1.

At decision block 1405, the transit node determines whether a temporary PCS state for the Ingress Path already exists. If so, which indicates that a packet on this path previously experienced congestion that triggered a path-CN for the path to the ingress node, the method 1300 flows to the decision block 1430. Otherwise, the method 1300 flows to the block 1410.

At block 1410, the transit node builds a path-CN message that includes the Path ID in the Ingress Path and, in some embodiments, a retry interval configured for the transit node. For example, the retry interval can be set to 120 seconds. At block 1415, the transit node transmits a predetermined number of path-CN messages to the ingress node that is identified from the node ID in the Ingress Path. At block 1420, the transit node creates a temporary PCS associated with the Node ID and Path ID. At block 1425, the transit node initiates a timer associated with the PCS that expires after a monitoring interval such as five seconds.

At decision block 1430, the transit node determines whether the received packet should be dropped. The packet can be dropped due to congestion reaching a level above a maximum threshold or in response to other functionality associated with the packet deciding to drop the packet. If the packet is not to be dropped, the method 1300 flows to the block 1435. Otherwise, the method flows to the block 1440.

At block 1435, the transit node transmits the packet to its next hop. The method 1300 then flows to the block 1445 and the method 1300 ends. At block 1440, the transit node drops the packet. The method 1300 then flows to the block 1445 and the method 1300 ends.

Figure 15:
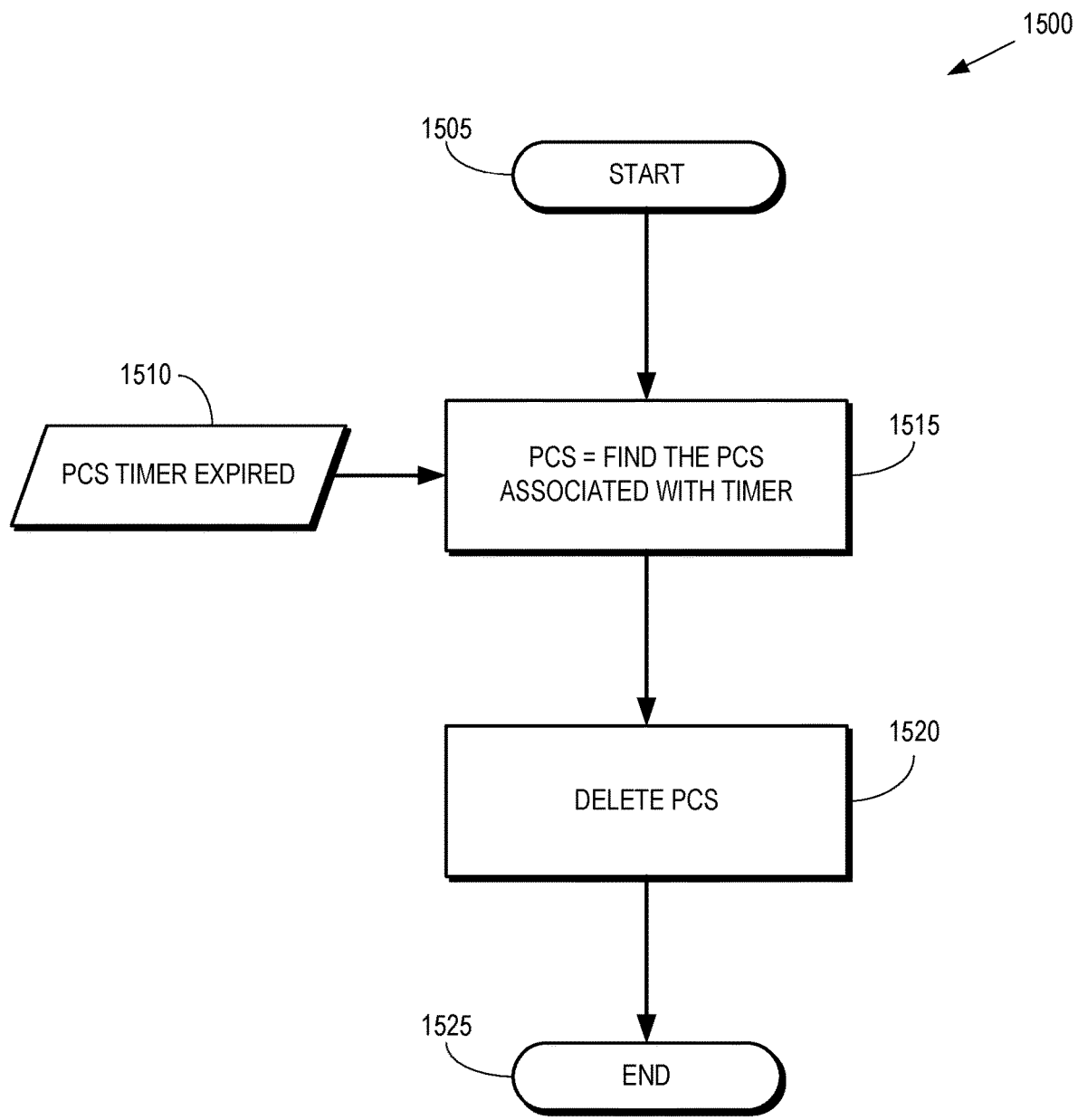
FIG. 15 is a flow diagram of a method of handling expiration of a path congestion state (PCS) timer according to some embodiments.

FIG. 15 is a flow diagram of a method 1500 of handling expiration of a path congestion state (PCS) timer according to some embodiments. As discussed herein, the PCS timer is established in a transit node in response to sending a path-CN message to an ingress node. The PCS timer countdown for a monitoring interval that is less than a retry interval used by the ingress node. The method 1500 is implemented in some embodiments of the communication system 500 shown in FIG. 5, the communication system 600 shown in FIG. 6, the communication system 700 shown in FIG. 7, and the communication system 800 shown in FIG. 8.

The method 1500 begins at the block 1505. Input 1510 to the method 1500 includes an indication that the PCS timer has expired.

At block 1515, the transit node identifies the PCS associated with the timer. In some embodiments, the transit node maintains multiple PCS timers that are established in response to transmitting path-CN messages to multiple ingress nodes to indicate congestion at the transit node. The multiple PCS timers may be established at different initial times or have different monitoring intervals.

At block 1520, the transit node deletes the identified PCS associated with the timer that has expired. The method 1500 then ends at the block 1525.

Figure 16:
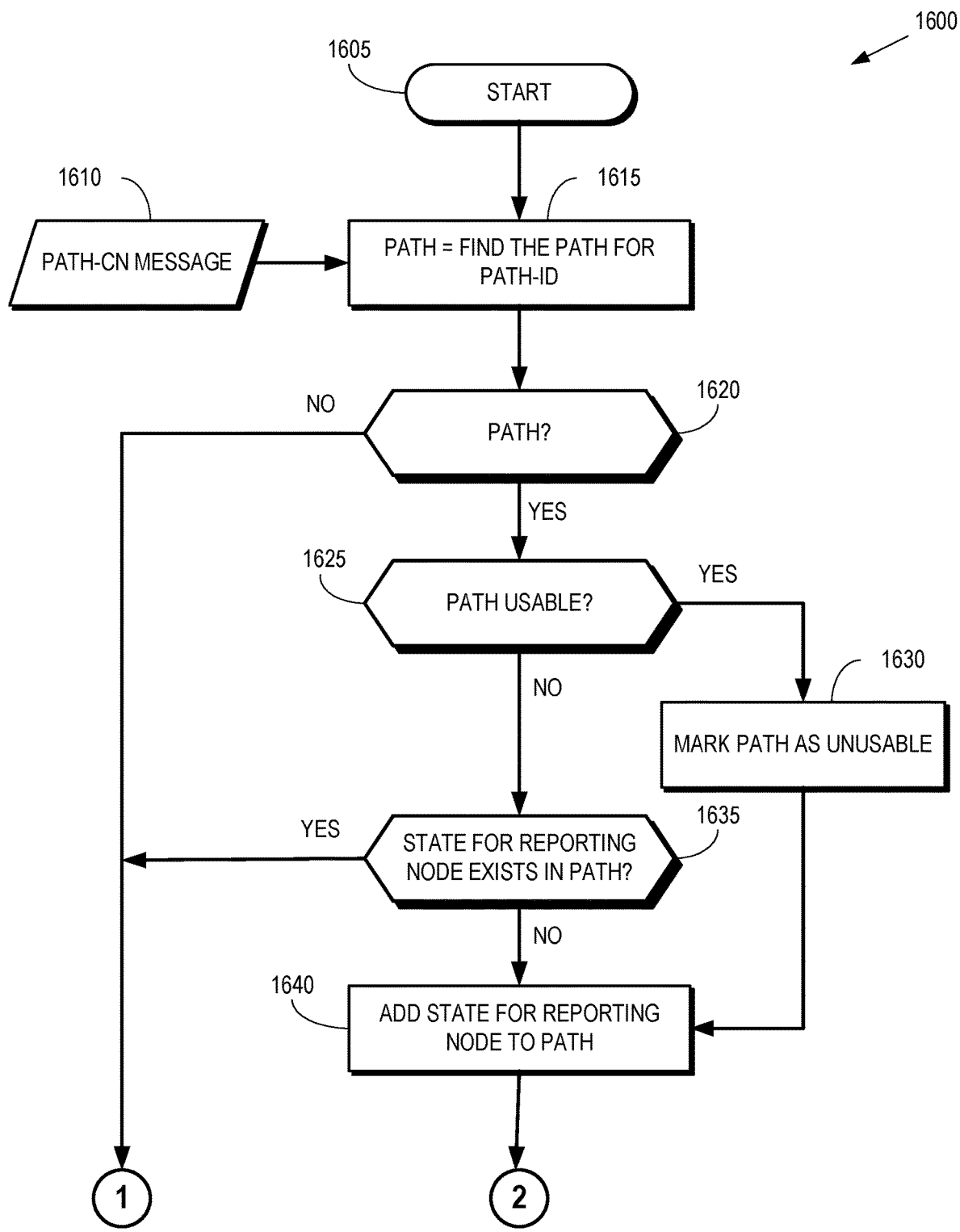
FIG. 16 is a flow diagram of a first portion of a method of processing a path-CN message at an ingress node according to some embodiments.

FIG. 16 is a flow diagram of a first portion of a method 1600 of processing a path-CN message at an ingress node according to some embodiments. The method 1600 is implemented in some embodiments of the communication system 500 shown in FIG. 5, the communication system 600 shown in FIG. 6, the communication system 700 shown in FIG. 7, and the communication system 800 shown in FIG. 8.

The method 1600 begins at the block 1605. Input 1610 to the method 1600 includes the path-CN message received at the ingress node from a transit node that has detected congestion along a path from the ingress node to a destination.

At block 1615, the ingress node parses the Path ID in the path-CN message and determines the path that is configured with the Path ID. At decision block 1620, the ingress node determines whether the path has been successfully identified using the Path ID. If not, the method 1600 flows to the block 1720 (in FIG. 17) via the node 1 and the method 1600 ends. If the ingress node successfully identifies the path using the Path ID, the method 1600 flows to the decision block 1625.

At decision block 1625, the ingress node determines whether the path is usable. In some cases, the ingress node has already set the path to an unusable state in response to receiving a previous path-CN message that included the Path ID. For example, the previous path-CN message could be a previous path-CN message from the transit node that is currently reporting congestion (because transit nodes can send more than one path-CN messages in response to detecting congestion) or a path-CN message transmitted from another node along the path that is also experiencing congestion. If the ingress node determines that the path is usable, the method 1600 flows to the block 1635. If the path is unusable, the method 1600 flows to the decision block 1630.

At the block 1630, the ingress node marks the path as unusable. The method 1600 then flows to the block 1640.

At the decision block 1635, the ingress node determines whether a congestion state for the currently reporting node (e.g., the transit node that is the source of the path-CN message) already exists due to reception of a previous path-CN message from the reporting node. If so, the method 1600 flows to the block 1720 (in FIG. 17) via the node 1 and the method 1600 ends. If the congestion state does not exist for the current reporting node, the method 1600 flows to the block 1640.

At block 1640, the ingress node adds a congestion state for the reporting node into the path. The method 1600 then flows to the decision block 1705 in FIG. 17 via the node 2.

Figure 17:
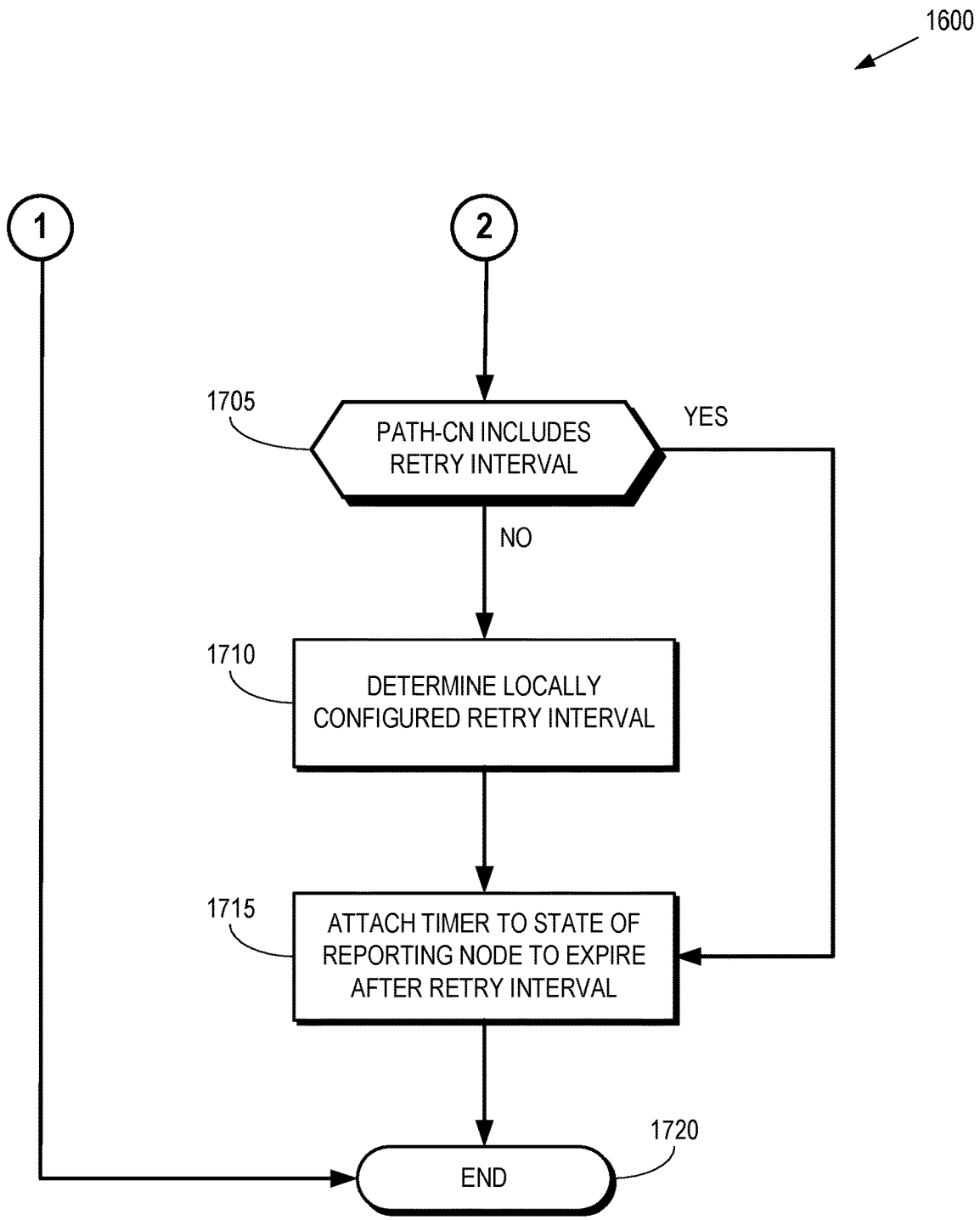
FIG. 17 is a flow diagram of a second portion of the method of processing the path-CN message at the ingress node according to some embodiments.

FIG. 17 is a flow diagram of a second portion of the method 1600 of processing the path-CN message at the ingress node according to some embodiments. The decision block 1705 in the second portion of the method 1600 is connected to the block 1640 in the first portion of the method 1600 shown in FIG. 16.

At decision block 1705, the ingress node determines whether the path-CN message includes a retry interval parameter. If a retry interval is not indicated in the path-CN message, the method 1600 flows to the block 1710. If the retry interval is indicated in the path-CN message, the method 1600 flows to the block 1715.

At block 1710, the ingress node determines a retry interval using a locally configured value. For example, the ingress node can determine the retry interval using a value randomly selected from within a predetermined range of retry intervals. The method 1600 then flows to the block 1715.

At block 1715, the ingress node attaches a timer to the congestion state of the reporting node. The timer is configured to expire after the retry interval received in the path-CN message or the retry interval determined locally by the ingress node. The method 1600 then flows to the block 1720 and the method 1600 ends.

Figure 18:
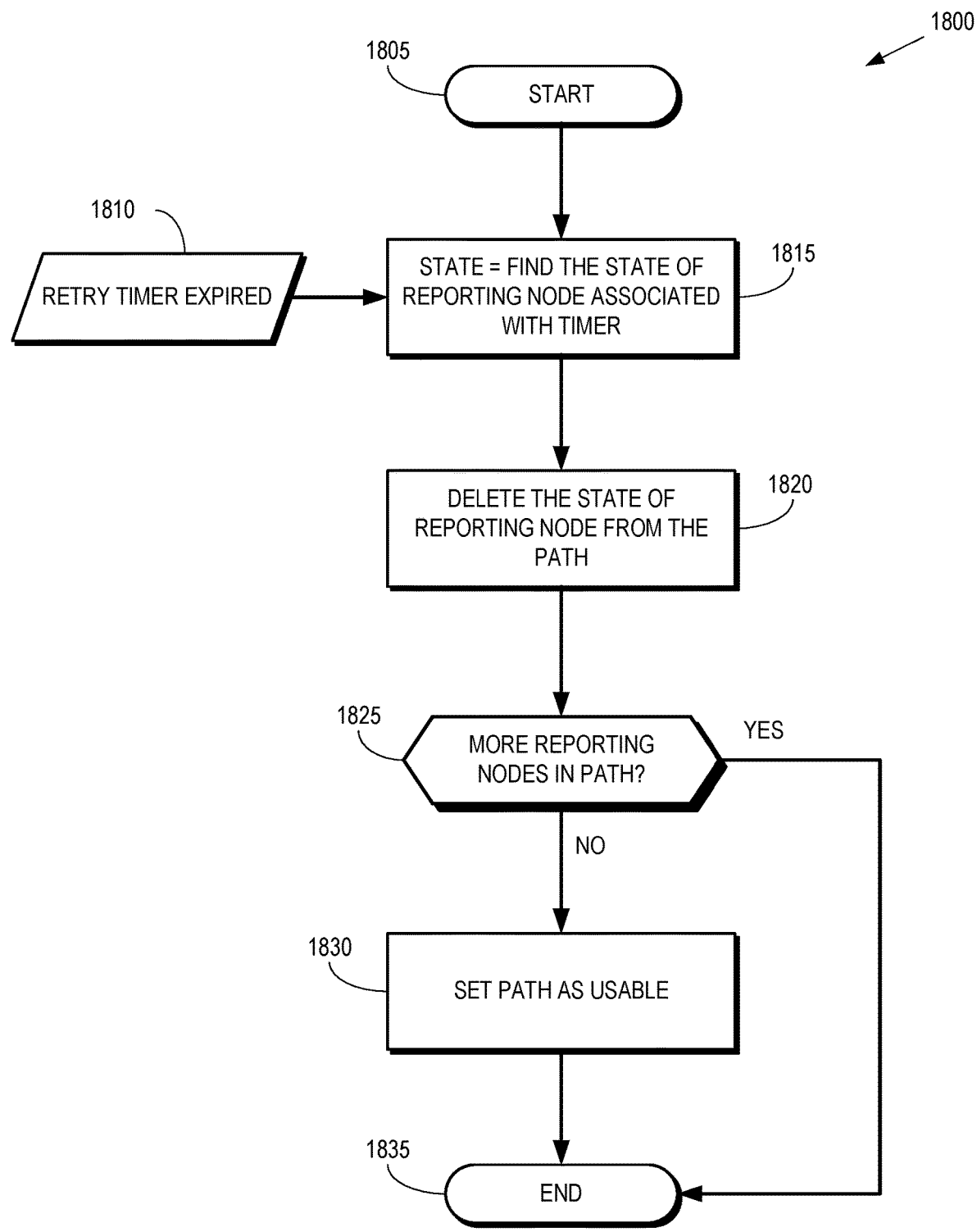
FIG. 18 is a flow diagram of a method performed by an ingress node in response to expiration of a timer indicating a retry interval according to some embodiments.

FIG. 18 is a flow diagram of a method 1800 performed by an ingress node in response to expiration of a timer indicating a retry interval according to some embodiments. The method 1800 is implemented in some embodiments of the communication system 500 shown in FIG. 5, the communication system 600 shown in FIG. 6, the communication system 700 shown in FIG. 7, and the communication system 800 shown in FIG. 8.

The method 1800 begins at the block 1805. Input 1810 to the method 1800 includes an indication of expiration of a retry interval for a path indicated by a Path ID in a previously received path-CN message.

At block 1815, the ingress node accesses a state of the reporting node associated with the timer. At block 1820, the ingress node deletes the state of the reporting node from the path in response to expiration of the retry interval. At decision block 1825, the ingress node determines whether there are more reporting nodes in the path. If the path has more nodes that also reported congestion than the ingress node determines that the path is still unusable and the method 1800 ends at the block 1835. If the ingress node determines that there are no additional nodes that also reported congestion, the method 1800 flows to the block

1830 and the ingress node sets the path in a usable state so that the ingress node is able to route packets along the path. The method 1800 then ends at the block 1835.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A node comprising:
   at least one processor; and
   at least one memory including instructions which, when executed by the at least one processor, cause the node at least to:
   receive a packet including a node identifier (node ID) for an ingress node of the packet and a path identifier (path ID) of a path from the ingress node to an egress node;
   generate a path congestion notification (path-CN) message addressed to the ingress node based on the node ID in response to detecting congestion, wherein the path-CN message comprises the path ID; and
   transmit a predetermined number of copies of the path-CN message towards the ingress node.

2. The node of claim 1, wherein the instructions, when executed by the at least one processor, cause the node at least to:
   incorporate a retry interval into the path-CN message to indicate when the ingress node should make another attempt to transmit packets along the path.

3. The node of claim 1, wherein the instructions, when executed by the at least one processor, cause the node at least to:
   parse the packet to identify a tuple comprising the node ID and the path ID.

4. The node of claim 3, wherein the instructions, when executed by the at least one processor, cause the node at least to:

create a temporary state associated with the tuple, wherein the temporary state persists for a monitoring interval that is less than the retry interval.

5. The node of claim 4, wherein the instructions, when executed by the at least one processor, cause the node at least to:
bypass generating additional path-CN messages in response to receiving subsequent packets from the ingress node via the path while the temporary state exists for the tuple.

6. The node of claim 5, wherein the instructions, when executed by the at least one processor, cause the node at least to:
delete the temporary state in response to expiration of the monitoring interval.

7. An ingress node comprising:
at least one processor; and
at least one memory including instructions which, when executed by the at least one processor, cause the ingress node at least to:
transmit a packet of a flow along a first path from the ingress node to an egress node, the packet comprising a node identifier (node ID) for the ingress node and a path identifier (path ID) of the first path;
receive a path congestion notification (path-CN) message in response to congestion along the first path, wherein the path-CN message is addressed to the ingress node based on the node ID, and wherein the path-CN message comprises the path ID;
select, in response to receiving the path-CN message, a second path for transmitting subsequent packets in the flow;
determine a retry interval for transmitting the subsequent packets in the flow; and
transmit the subsequent packets in the flow along the second path in response to expiration of the retry interval.

8. The ingress node of claim 7, wherein the instructions, when executed by the at least one processor, cause the ingress node at least to:
encode the packet with a tuple that includes the node ID and the path ID of the first path.

9. The ingress node of claim 7, wherein the path-CN message comprises an indication of the retry interval.

10. The ingress node of claim 7, wherein the path-CN message does not indicate the retry interval, and wherein the retry interval is determined locally at the ingress node.

11. The ingress node of claim 7, wherein a rate of packet transmission along the first path is limited to a maximum transmission rate.

12. The ingress node of claim 7, wherein the instructions, when executed by the at least one processor, cause the ingress node at least to:
select a third path or revert to the first path in response to receiving an indication of congestion, unusability, or failure along the second path.

13. A method comprising:
transmitting a packet of a flow along a first path from an ingress node to an egress node, the packet comprising a node identifier (node ID) for the ingress node and a path identifier (path ID) of the first path;
receiving a path congestion notification (path-CN) message in response to congestion along the first path, wherein the path-CN message is addressed to the ingress node based on the node ID, and wherein the path-CN message comprises the path ID;
selecting, in response to receiving the path-CN message, a second path for transmitting subsequent packets in the flow;
determining a retry interval for transmitting the subsequent packets in the flow; and
transmitting the subsequent packets in the flow along the second path in response to expiration of the retry interval.

14. The method of claim 13, further comprising:
incorporating an indication of the retry interval into the path-CN message.

15. The method of claim 14, wherein receiving the path-CN message comprises receiving a predetermined number of copies of the path-CN message.

16. The method of claim 13, further comprising:
determining the retry interval at the ingress node in response to the path-CN message not a including an indication of the retry interval.

17. The method of claim 13, further comprising:
limiting a rate of packet transmission along the first path to a maximum transmission rate.

18. The method of claim 13, further comprising:
selecting a third path or reverting to the first path in response to receiving an indication of congestion, unusability, or failure along the second path.

* * * * *